United States Patent
Nakayama

(10) Patent No.: US 10,852,896 B2
(45) Date of Patent: Dec. 1, 2020

(54) TOUCH PANEL USED AS TOUCH SENSOR TO INCREASE TOUCH DETECTION SENSITIVITY, INCLUDING CONDUCTIVE MEMBER AND CONDUCTIVE SHEET

(71) Applicant: FUJIFILM Corporation, Tokyo (JP)

(72) Inventor: Masaya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/525,967

(22) Filed: Jul. 30, 2019

(65) Prior Publication Data

US 2019/0354239 A1 Nov. 21, 2019

Related U.S. Application Data

(63) Continuation of application No. PCT/JP2018/005484, filed on Feb. 16, 2018.

(30) Foreign Application Priority Data

Mar. 6, 2017 (JP) ................. 2017-041464

(51) Int. Cl.
*G06F 3/044* (2006.01)
(52) U.S. Cl.
CPC .......... *G06F 3/0445* (2019.05); *G06F 3/0446* (2019.05); *G06F 3/0448* (2019.05);
(Continued)
(58) Field of Classification Search
CPC . G06F 3/041–0428; G06F 2203/04103–04113
See application file for complete search history.

(56) References Cited

U.S. PATENT DOCUMENTS

| 2013/0063371 A1* | 3/2013 | Lee ......................... G06F 3/044 345/173 |
| 2015/0022736 A1* | 1/2015 | Kim ..................... H05K 1/0296 349/12 |

(Continued)

FOREIGN PATENT DOCUMENTS

| JP | 2013-101712 A | 5/2013 |
| JP | 2015-232818 A | 12/2015 |
| JP | 2016-126731 A | 7/2016 |

OTHER PUBLICATIONS

International Search Report Issued in PCT/JP2018/005484 dated May 1, 2018.

(Continued)

*Primary Examiner* — Sanghyuk Park
(74) *Attorney, Agent, or Firm* — Edwars Neils LLC; Jean C. Edwards, Esq.

(57) ABSTRACT

A touch panel has a first electrode layer positioned on a first surface of a transparent insulating member and a second electrode layer positioned on a second surface of the transparent insulating member. The first electrode layer is provided with a plurality of first strip electrodes having a bent shape, and the second electrode layer is provided with a plurality of second strip electrodes having a bent shape. There is at least one combination of the first strip electrode and the second strip electrode satisfying an electrode width W1 of the first strip electrode<an electrode width W2 of the second strip electrode in a main sensing region not including electrodes disposed on outermost sides of the plurality of first strip electrodes and electrodes disposed on outermost sides of the plurality of second strip electrodes in a region where the first electrode layer and the second electrode layer are provided.

17 Claims, 11 Drawing Sheets

(52) U.S. Cl.
CPC .............. *G06F 2203/04103* (2013.01); *G06F 2203/04112* (2013.01)

(56) References Cited

U.S. PATENT DOCUMENTS

2015/0355510 A1    12/2015   Kurasawa et al.
2017/0083052 A1*   3/2017    Hong ..................... G06F 3/044

OTHER PUBLICATIONS

Written Opinion Issued in PCT/JP2018/005484 dated May 1, 2018.
International Preliminary Report on Patentability Issued in PCT/JP2018/005484 dated Sep. 10, 2019.
Office Action, issued by the Japanese Patent Office dated Aug. 4, 2020, in connection with corresponding Japanese Patent Application No. 2019-504421.

* cited by examiner

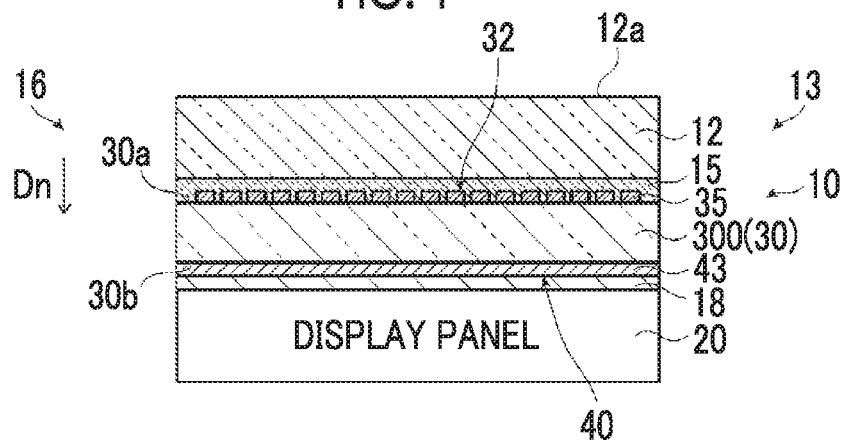
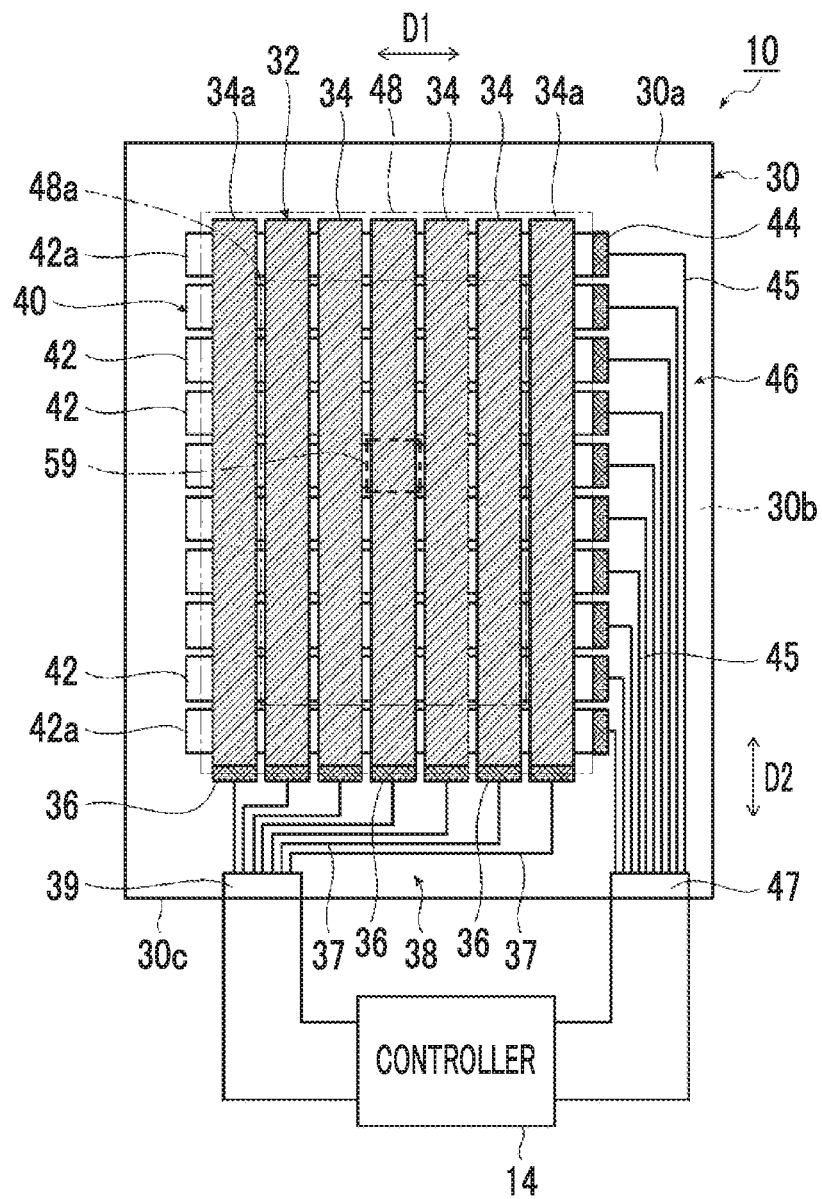

TOUCH PANEL USED AS TOUCH SENSOR TO INCREASE TOUCH DETECTION SENSITIVITY, INCLUDING CONDUCTIVE MEMBER AND CONDUCTIVE SHEET

CROSS-REFERENCE TO RELATED APPLICATIONS

This application is a Continuation of PCT International Application No. PCT/JP2018/5484, filed on Feb. 16, 2018, which was published under PCT Article 21(2) in Japanese, and which claims priority under 35 U.S.C. § 119(a) to Japanese Patent Application No. 2017-041464, filed on Mar. 6, 2017. The above applications are hereby expressly incorporated by reference, in their entirety, into the present application.

BACKGROUND OF THE INVENTION

1. Field of the Invention

The present invention relates to a conductive member, a touch panel that is disposed on a display panel and used as a touch sensor, and a conductive sheet for a touch panel that is used for the touch panel, and particularly, to a touch panel in which detection sensitivity for touch detection is adjusted, and a conductive sheet for a touch panel that is used for the touch panel.

2. Description of the Related Art

Currently, the resistance of a detection electrode that detects a touch can be reduced in electrostatic capacitance-type touch panels using thin metallic wires. Accordingly, high-sensitivity touch panels can be provided, and thus attract attention.

For example, JP2016-126731A discloses a high-sensitivity touch panel in which electrode wire disconnection is prevented by providing, in a strip electrode formed of electrode wires, main wires of the electrode wires and sub-wires connecting the main wires.

SUMMARY OF THE INVENTION

In the touch panel disclosed in JP2016-126731A, since the parasitic capacitance at an electrode intersection portion can be reduced in comparison to a touch panel using a metallic mesh electrode, higher sensitivity can be expected than in the touch panel using a metallic mesh electrode. However, in a case where the touch panel is actually driven, erroneous detection may be generated in the detection of a touch by a member such as a stylus pen with a tip end that is finer than a finger, although it is not generated in the detection of a touch by a finger.

An object of the invention is to provide a touch sensor that can solve the problems based on the related art and is capable of suppressing erroneous detection even in the detection of a touch by a member with a tip end that is finer than a finger, a touch panel, a conductive member for a touch panel, and a conductive sheet for a touch panel.

In order to achieve the above-described object, the invention provides a touch panel comprising: a transparent insulating member; a first electrode layer that is positioned on a first surface of the transparent insulating member; and a second electrode layer that is positioned on a second surface opposed to the first surface of the transparent insulating member, in which the first surface is on a contact detection side, the first electrode layer is provided with a plurality of first strip electrodes that are disposed at intervals in a first direction and extend in a second direction perpendicular to the first direction, the first strip electrode has a plurality of first electrode wires having a bent shape that are disposed at intervals in the first direction and extend in the second direction perpendicular to the first direction, and a first pad to which the plurality of first electrode wires are electrically connected, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, and a second pad to which the plurality of second electrode wires are electrically connected, and in a case where an electrode width of the first strip electrode is indicated by W1 and an electrode width of the second strip electrode is indicated by W2, there is at least one combination of the first strip electrode and the second strip electrode satisfying W1<W2 in a main sensing region not including electrodes disposed on outermost sides of the plurality of first strip electrodes and electrodes disposed on outermost sides of the plurality of second strip electrodes in a region where the first electrode layer and the second electrode layer are provided.

It is preferable that in the main sensing region, the electrode width W1 of the first strip electrode and the electrode width W2 of the second strip electrode satisfy W1<W2.

Regarding the first strip electrode and the second strip electrode satisfying W1<W2 in the main sensing region, it is preferable that the electrode width W1 of the first strip electrode and the electrode width W2 of the second strip electrode satisfy $1.0<W2/W1\leq 3.0$. Regarding the first strip electrode and the second strip electrode satisfying W1<W2 in the main sensing region, it is more preferable that the electrode width W1 of the first strip electrode and the electrode width W2 of the second strip electrode satisfy $1.2\leq W2/W1\leq 2.0$.

It is preferable that the first electrode wire is a thin metallic wire having a line width of 10 μm or less, and the second electrode wire is a thin metallic wire having a line width of 10 μm or less.

It is preferable that the first strip electrode further has a plurality of first connecting wires electrically connecting the first electrode wires adjacent to each other, and the second strip electrode further has a plurality of second connecting wires electrically connecting the second electrode wires adjacent to each other.

It is preferable that the first strip electrode further has a plurality of first non-connecting wires that are not electrically connected to the first electrode wires, and the second strip electrode further has a plurality of second non-connecting wires that are not electrically connected to the second electrode wires.

It is preferable that in a case where a total area of the first non-connecting wires in the first strip electrode is indicated by A1, a total area of the first electrode wires and the first connecting wires in the first strip electrode is indicated by B1, and an occupation ratio of the first non-connecting wires in the first strip electrode is indicated by C1, C1=A1/(A1+B1) is satisfied, in a case where a total area of the second non-connecting wires in the second strip electrode is indicated by A2, a total area of the second electrode wires and the second connecting wires in the second strip electrode is indicated by B2, and an occupation ratio of the second non-connecting wires in the second strip electrode is indicated by C2, C2=A2/(A2+B2) is satisfied, and the occupation ratio C1 of the first non-connecting wires in the first strip electrode and the occupation ratio C2 of the second non-connecting wires in the second strip electrode satisfy C2<C1.

It is preferable that the first electrode wire, the first non-connecting wire, the first connecting wire, the second electrode wire, the second non-connecting wire, and the second connecting wire have the same line width of 5 μm or less.

The invention provides a conductive sheet for a touch panel comprising: a transparent insulating member; a first electrode layer that is positioned on a first surface of the transparent insulating member; and a second electrode layer that is positioned on a second surface opposed to the first surface of the transparent insulating member, in which the first electrode layer is provided with a plurality of first strip electrodes that are disposed at intervals in a first direction and extend in a second direction perpendicular to the first direction, the first strip electrode has a plurality of first electrode wires having a bent shape that are disposed at intervals in the first direction and extend in the second direction perpendicular to the first direction, and a first pad to which the plurality of first electrode wires are electrically connected, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, and a second pad to which the plurality of second electrode wires are electrically connected, and in a case where an electrode width of the first strip electrode is indicated by W1 and an electrode width of the second strip electrode is indicated by W2, there is at least one combination of the first strip electrode and the second strip electrode satisfying W1<W2 in a main sensing region not including electrodes disposed on outermost sides of the plurality of first strip electrodes and electrodes disposed on outermost sides of the plurality of second strip electrodes in a region where the first electrode layer and the second electrode layer are provided.

The invention provides a touch sensor comprising: a transparent insulating member; a first electrode layer that is positioned on a first surface of the transparent insulating member; and a second electrode layer that is positioned on a second surface opposed to the first surface of the transparent insulating member, in which the first surface is on a contact detection side, the first electrode layer is provided with a plurality of first strip electrodes that are disposed at intervals in a first direction and extend in a second direction perpendicular to the first direction, the first strip electrode has a plurality of first electrode wires having a bent shape that are disposed at intervals in the first direction and extend in the second direction perpendicular to the first direction, and a first pad to which the plurality of first electrode wires are electrically connected, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, and a second pad to which the plurality of second electrode wires are electrically connected, and in a case where an electrode width of the first strip electrode is indicated by W1 and an electrode width of the second strip electrode is indicated by W2, there is at least one combination of the first strip electrode and the second strip electrode satisfying W1<W2 in a main sensing region not including electrodes disposed on outermost sides of the plurality of first strip electrodes and electrodes disposed on outermost sides of the plurality of second strip electrodes in a region where the first electrode layer and the second electrode layer are provided.

The invention provides a conductive member for a touch panel comprising: a transparent insulating member; a first electrode layer that is positioned on a first surface of the transparent insulating member; and a second electrode layer that is positioned on a second surface opposed to the first surface of the transparent insulating member, in which the first electrode layer is provided with a plurality of first strip electrodes that are disposed at intervals in a first direction and extend in a second direction perpendicular to the first direction, the first strip electrode has a plurality of first electrode wires having a bent shape that are disposed at intervals in the first direction and extend in the second direction perpendicular to the first direction, and a first pad to which the plurality of first electrode wires are electrically connected, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, and a second pad to which the plurality of second electrode wires are electrically connected, and in a case where an electrode width of the first strip electrode is indicated by W1 and an electrode width of the second strip electrode is indicated by W2, there is at least one combination of the first strip electrode and the second strip electrode satisfying W1<W2 in a main sensing region not including electrodes disposed on outermost sides of the plurality of first strip electrodes and electrodes disposed on outermost sides of the plurality of second strip electrodes in a region where the first electrode layer and the second electrode layer are provided.

A display device may have a display panel and a conductive sheet for a touch panel, and a first electrode layer, a transparent insulating member, and a second electrode layer in the conductive sheet for a touch panel, and the display panel may be laminated in this order.

According to the invention, it is possible to suppress erroneous detection even in the detection of a touch by a member with a tip end that is finer than a finger.

BRIEF DESCRIPTION OF THE DRAWINGS

FIG. 1 is a cross-sectional view schematically illustrating a configuration of a touch panel according to an embodiment of the invention.

FIG. 2 is a plan view schematically illustrating the touch panel according to the embodiment of the invention.

DESCRIPTION OF THE PREFERRED EMBODIMENTS

Hereinafter, a touch panel and a conductive sheet for a touch panel according to an embodiment of the invention will be described in detail based on preferable embodiments illustrated in the accompanying drawings.

In the following description, the expression "to" indicating a numerical value range includes numerical values on both sides of "to". For example, in a case where $\varepsilon$ is a numerical value $\alpha$ to a numerical value $\beta$, the range of includes the numerical values $\alpha$ and $\beta$, and is expressed as $\alpha \leq \varepsilon \leq \beta$ using mathematical symbols.

An angle expressed using the expression such as an "angle represented by a concrete numerical value", "parallel", "vertical", or "perpendicular" includes an error range that is generally permitted in the corresponding technical field unless otherwise noted.

The expression "the same" includes an error range that is generally permitted in the technical field unless otherwise noted.

The expression transparent means that the light transmittance is 40% or greater, preferably 80% or greater, and more preferably 90% or greater in a visible light wavelength range ranging from 380 to 780 nm.

The light transmittance is measured using, for example, "Plastics—Determination of Total Luminous Transmittance and Reflectance" specified in JIS (Japanese Industrial Standards) K 7375: 2008.

Figure 3:
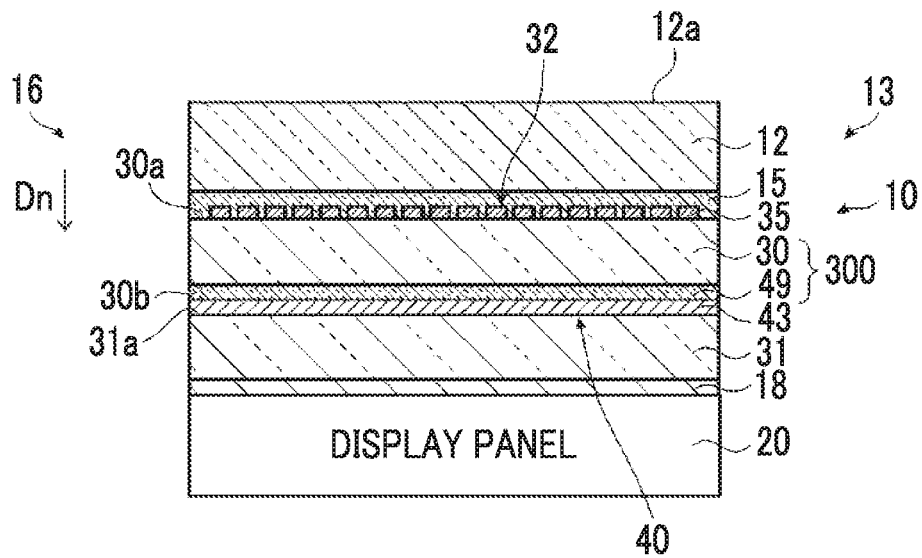
FIG. 3 is a cross-sectional view schematically illustrating another example of the configuration of the touch panel according to an embodiment of the invention.
Figure 4:
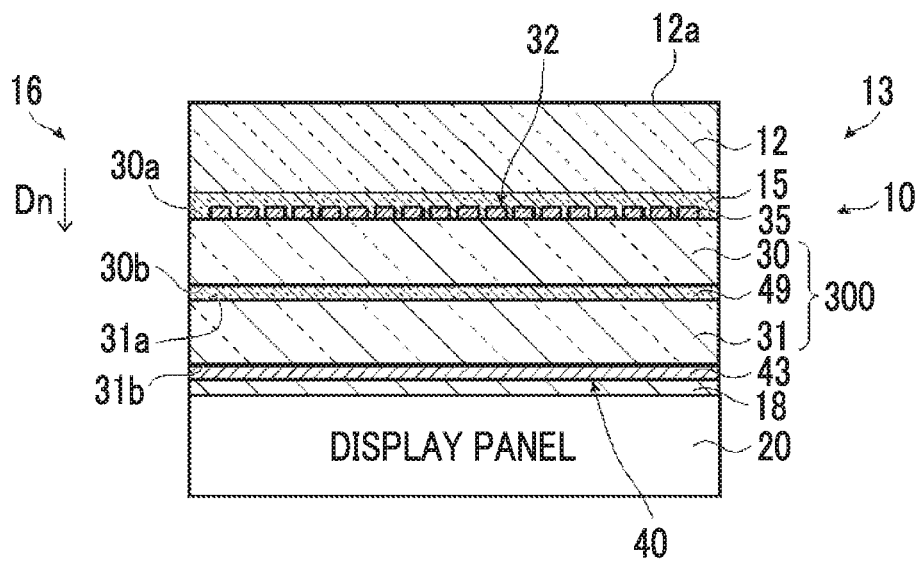
FIG. 4 is a cross-sectional view schematically illustrating a further example of the configuration of the touch panel according to an embodiment of the invention.

FIG. 1 is a cross-sectional view schematically illustrating a configuration of a touch panel according to an embodiment of the invention. FIG. 2 is a plan view schematically illustrating the touch panel according to the embodiment of the invention. FIGS. 3 and 4 are cross-sectional views schematically illustrating other examples of the configuration of the touch panel according to an embodiment of the invention.

As illustrated in FIG. 1, for example, a conductive sheet 10 for a touch panel as a conductive member is provided on a display panel 20 via, for example, a transparent layer 18.

A cover layer 12 is provided on the conductive sheet 10 for a touch panel via a transparent layer 15. The conductive sheet 10 for a touch panel is connected to a controller 14 (see FIG. 2).

The conductive sheet 10 for a touch panel and the cover layer 12 form a touch sensor 13, and the conductive sheet 10 for a touch panel, the cover layer 12, and the controller 14 form a touch panel 16. The touch panel 16 and the display panel 20 form a display device that is an electronic device. The electronic device is not limited to the above-described display device.

A front surface 12a of the cover layer 12 serves as a surface where a display object displayed in a display region (not shown) of the display panel 20 is visually recognized. In addition, the front surface 12a of the cover layer 12 serves as a touch face of the touch panel 16, and as an operation face. The touch face refers to a face that detects a contact of a finger or a member such as a stylus pen with a tip end that is finer than a finger.

The controller 14 is formed of a known controller that is used for the detection of an electrostatic capacitance-type touch sensor. In the touch panel 16, the controller 14 detects a position where the electrostatic capacity changes due to a contact of a finger or the like to the front surface 12a of the cover layer 12. The touch panel 16 includes the conductive sheet 10 for a touch panel as described above. The touch panel 16 including the conductive sheet 10 for a touch panel is suitably used as an electrostatic capacitance-type touch panel. Electrostatic capacitance-type touch panels include mutual capacitance-type touch panels and self-capacitance-type touch panels, and the above touch panel is particularly most suitable as a mutual capacitance-type.

The cover layer 12 is a layer for protecting the conductive sheet 10 for a touch panel. The configuration of the cover layer 12 is not particularly limited. For example, glass such as plate glass or reinforced glass, or an acrylic resin such as polycarbonate (PC), polyethylene terephthalate (PET), or a polymethylmethacrylate resin (PMMA) is used as the cover layer 12. Since the front surface 12*a* of the cover layer 12 serves as a touch face as described above, a hard coat layer may be provided on the front surface 12*a* as necessary. The thickness of the cover layer 12 is 0.1 to 1.3 mm, and is particularly preferably 0.1 to 0.7 mm.

The transparent layer 18 is optically transparent and has an insulating property. In addition, the configuration thereof is not particularly limited as long as the transparent layer can stably fix the conductive sheet 10 for a touch panel and the display panel 20. As the transparent layer 18, for example, an optically transparent pressure sensitive adhesive (optical clear adhesive, OCA) or an optically transparent resin (optical clear resin, OCR) such as an ultraviolet (UV) curable resin can be used. The transparent layer 18 may be partially hollow.

A configuration may also be employed in which the conductive sheet 10 for a touch panel is provided on the display panel 20 with a gap therebetween without the transparent layer 18. The gap is also referred to as an air gap.

In addition, the transparent layer 15 is optically transparent and has an insulating property. In addition, the configuration thereof is not particularly limited as long as the transparent layer can stably fix the conductive sheet 10 for a touch panel and the cover layer 12. The same one as the transparent layer 18 can be used as the transparent layer 15.

The display panel 20 is provided with a display region (not shown), and is, for example, a liquid crystal display panel. The display panel 20 is not limited to a liquid crystal display panel, and may be an organic electroluminescence (EL) display panel.

The electronic device has the conductive sheet 10 for a touch panel or the touch panel 16, and is not particularly limited as long as it has the conductive sheet 10 for a touch panel or the touch panel 16. Examples of the electronic device include the above-described display device. Specific examples of the electronic device include cellular phones, smartphones, portable information terminals, car navigation systems, tablet terminals, notebook personal computers, and desktop personal computers.

The conductive sheet 10 for a touch panel is used for an electrostatic capacitance-type touch sensor, in particular, a mutual capacitance-type touch sensor.

A transparent insulating member 300 is used in the conductive sheet 10 for a touch panel. In the conductive sheet 10 for a touch panel, specifically, a transparent insulating base 30 can be used as the transparent insulating member 300, and a first electrode layer 32 is provided on a front surface 30*a* of the transparent insulating base 30 as illustrated in FIG. 1. In addition, a second electrode layer 40 is provided on a rear surface 30*b* of the transparent insulating base 30. The second electrode layer 40 is disposed to be opposed to the first electrode layer 32 in an insulated state. FIG. 1 illustrates a configuration in which the first electrode layer 32 and the second electrode layer 40 are directly formed on the front surface 30*a* and the rear surface 30*b* of the transparent insulating base 30, respectively, but at least one underlayer (under coat layer) or adhesion reinforcing layer for enhancing adhesion between the electrode layer and the transparent insulating base, or at least another functional layer may be provided between the transparent insulating base 30 and the first electrode layer 32 and between the transparent insulating base 30 and the second electrode layer 40.

The front surface 30*a* of the transparent insulating base 30 is a first surface, and the rear surface 30*b* of the transparent insulating base 30 is a second surface opposed to the first surface. The cover layer 12 is laminated on the front surface 30*a* of the transparent insulating base 30, and the front surface 30*a* of the transparent insulating base 30 is on the touch face side, that is, on the contact detection side. That is, the first surface is on the touch face side, that is, on the contact detection side.

As illustrated in FIG. 2, the first electrode layer 32 is provided with a plurality of first strip electrodes 34. The plurality of first strip electrodes 34 are disposed at intervals in a first direction D1 and extend in a second direction D2 perpendicular to the first direction D1. The first strip electrode 34 is a long electrode.

The first strip electrode 34 has a plurality of first electrode wires 35 and a first pad 36 to which the plurality of first electrode wires 35 are electrically connected at intervals. The first electrode wire 35 has a bent shape as will be described in detail later.

Regarding the plurality of first strip electrodes 34, a first peripheral wire 37 is electrically connected to the first pad 36 of each first strip electrode 34. The first peripheral wires 37 are arranged close to each other, and the plurality of first peripheral wires 37 are individually connected to respective terminals for connection to the controller 14. These terminals are collected in one terminal connection region 39 at one side 30*c* of the transparent insulating base 30. The plurality of first peripheral wires 37 are collectively referred to as a first peripheral wiring portion 38.

As illustrated in FIG. 2, the second electrode layer 40 is provided with a plurality of second strip electrodes 42. The plurality of second strip electrodes 42 are disposed at intervals in the second direction D2 and extend in the first direction D1. The second strip electrode 42 is a long electrode.

The second strip electrode 42 has a plurality of second electrode wires 43 and a second pad 44 to which the plurality of second electrode wires 43 are electrically connected at intervals. The second electrode wire 43 has a bent shape as will be described in detail later.

Regarding the plurality of second strip electrodes 42, a second peripheral wire 45 is electrically connected to the second pad 44 of each second strip electrode 42. The second peripheral wires 45 are arranged close to each other. The plurality of second peripheral wires 45 are individually connected to respective terminals for connection to the controller 14, and these terminals are collected in one terminal connection region 47 at one side 30*c* of the transparent insulating base 30. The plurality of second peripheral wires 45 are collectively referred to as a second peripheral wiring portion 46.

The first strip electrode 34 and the second strip electrode 42 are insulated by the transparent insulating member 300, and disposed so as to at least partially overlap and intersect with each other. An intersection portion 59 is not limited as long as it is a region where the first strip electrode 34 and the second strip electrode 42 are overlapped. Specifically, when viewed in a direction Dn (see FIG. 3) vertical to one surface of the transparent insulating base 30, the second strip electrode 42 is disposed so as to at least partially overlap and intersect with the first strip electrode 34. The lamination direction in which the first strip electrode 34 and the second strip electrode 42 are overlapped is the same as the vertical direction Dn (see FIG. 1). A sensing region 48 illustrated in FIG. 2 that detects a touch is formed by the plurality of first strip electrodes 34 and the plurality of second strip electrodes 42. The sensing region 48 serves as a sensor region. In the sensing region 48 where the first electrode layer 32 and the second electrode layer 40 are provided, a sensing region not including electrodes 34a disposed on both outermost sides of the plurality of first strip electrodes 34 and electrodes 42a disposed on both outermost sides of the plurality of second strip electrodes 42 as illustrated in FIG. 2 is defined as a main sensing region 48a. That is, the main sensing region 48a is a sensing region excluding the electrodes 34a disposed on both outermost sides of the plurality of first strip electrodes 34 and the electrodes 42a disposed on both outermost sides of the plurality of second strip electrodes 42.

The plurality of first strip electrodes 34 disposed in the main sensing region 48a preferably have the same configuration in order to make detection sensitivity uniform in any configuration to be described later. The plurality of second strip electrodes 42 disposed in the main sensing region 48a also preferably have the same configuration in order to make detection sensitivity uniform in any configuration to be described later.

Unlike other strip electrodes, the electrodes 34a and 42a disposed on the outermost sides are influenced by the first peripheral wires 37 and the second peripheral wires 45 disposed out of the sensing region 48, and ground wires (not shown), and the detection sensitivity changes. Accordingly, the electrodes 34a and 42a disposed on the outermost sides may have a different electrode shape from those of other strip electrodes in order to adjust the detection sensitivity in accordance with the layout of the first peripheral wires 37, the second peripheral wires 45, and the ground wires.

As illustrated in FIG. 1, by providing the first strip electrodes 34 on the front surface 30a of one transparent insulating base 30 and proving the second strip electrodes 42 on the rear surface 30b, a deviation in the positional relation between the first strip electrodes 34 and the second strip electrodes 42 can be reduced even in a case where the transparent insulating base 30 contracts.

Each of the first peripheral wire 37 and the second peripheral wire 45 is formed of, for example, a conductor wire. The constituent members of the touch panel 16 including the conductive sheet 10 for a touch panel will be described in detail later.

In the conductive sheet 10 for a touch panel, the region where the plurality of first strip electrodes 34 and the plurality of second strip electrodes 42 are disposed to overlap in plan view via the transparent insulating member 300 (transparent insulating base 30 in FIG. 1) is the sensing region 48. The sensing region 48 is a sensing region capable of detecting a contact of a finger or the like, that is, a touch in an electrostatic capacitance-type touch panel. The conductive sheet 10 for a touch panel is disposed on the display panel 20 such that the sensing region 48 is overlapped on the display region of the display panel 20. Therefore, the sensing region 48 is also a visible region. The sensing region 48 serves as an image display region in a case where an image is displayed on the display region of the display panel 20 (see FIG. 1).

For example, a decorative layer (not shown) having a light shielding function is provided in a region where the first peripheral wiring portion 38 and the second peripheral wiring portion 46 are formed. The first peripheral wiring portion 38 and the second peripheral wiring portion 46 are made invisible by covering the first peripheral wiring portion 38 and the second peripheral wiring portion 46 with the decorative layer.

The configuration of the decorative layer is not particularly limited as long as the decorative layer can make the first peripheral wiring portion 38 and the second peripheral wiring portion 46 invisible, and a known decorative layer can be used. For forming the decorative layer, various printing methods such as a screen printing method, a gravure printing method, and an offset printing method, transfer methods, and vapor deposition methods can be used, and the decorative layer is formed on the cover layer 12.

The conductive sheet 10 for a touch panel is not particularly limited to the configuration illustrated in FIGS. 1 and 2. For example, as in conductive sheets 10 for a touch panel illustrated in FIGS. 3 and 4, a configuration may also be employed in which a first electrode layer 32 is provided on one transparent insulating base 30 and a second electrode layer 40 is provided on another different transparent insulating base 31. The conductive sheet 10 for a touch panel may have a configuration in which a transparent insulating base 31 having a second electrode layer 40 provided on a front surface 31a via a transparent adhesive layer 49 is laminated on a rear surface 30b of one transparent insulating base 30 having a first electrode layer 32 provided on a front surface 30a of the transparent insulating base 30. In addition, a configuration may also be employed in which a transparent insulating base 31 having a second electrode layer 40 provided on a rear surface 31b via a transparent adhesive layer 49 is laminated on a rear surface 30b of one transparent insulating base 30 having a first electrode layer 32 provided on a front surface 30a of the transparent insulating base 30 as illustrated in FIG. 4. That is, a structure having a first electrode layer 32 that is positioned on a first surface of a transparent insulating member 300 and a second electrode layer 40 that is positioned on a second surface opposed to the first surface of the transparent insulating member 300, that is, a structure in which the first electrode layer 32 and the second electrode layer 40 are insulated by the transparent insulating member 300 may be employed. In FIG. 3, the transparent insulating base 30 and the transparent adhesive layer 49 form the transparent insulating member 300, and in FIG. 4, the transparent insulating base 30, the transparent adhesive layer 49, and the transparent insulating base 31 form the transparent insulating member 300. The front surface 30a of the transparent insulating base 30 is on the touch face side in any one of the configuration illustrated in FIG. 3 and the configuration illustrated in FIG. 4. That is, the first electrode layer 32 is disposed closer to the touch face side, that is, the contact detection side than the second electrode layer 40.

Although not illustrated in the drawing, a configuration (single-side lamination configuration) may also be employed in which a first electrode layer 32 and a second electrode layer 40 are laminated on a transparent insulating base 30 via an insulating film. In this case, the insulating film corresponds to the transparent insulating member 300, and the first electrode layer 32 is disposed on the touch face side, that is, on the contact detection side.

The transparent insulating base 31 may have the same configuration as the transparent insulating base 30, or may have a different configuration. The same one as the above-described transparent layer 18 can be used as the transparent adhesive layer 49. In any one of the configuration illustrated in FIG. 3 and the configuration illustrated in FIG. 4, the lamination direction in which the first strip electrode 34 and the second strip electrode 42 are overlapped is the same as the vertical direction Dn.

Next, the first electrode layer and the second electrode layer of the conductive sheet for a touch panel will be described.

Figure 5:
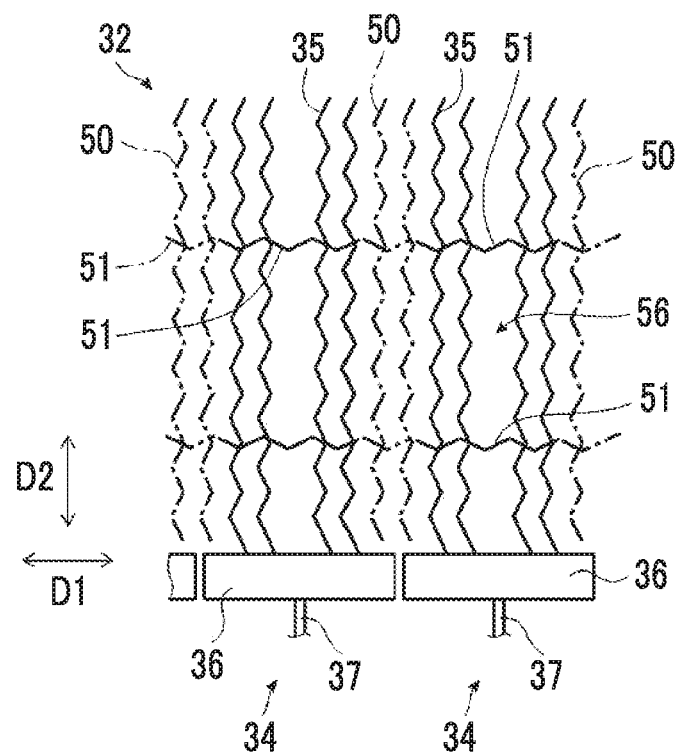
FIG. 5 is a view schematically illustrating a first example of a first electrode layer of a conductive sheet for a touch panel according to an embodiment of the invention.
Figure 6:
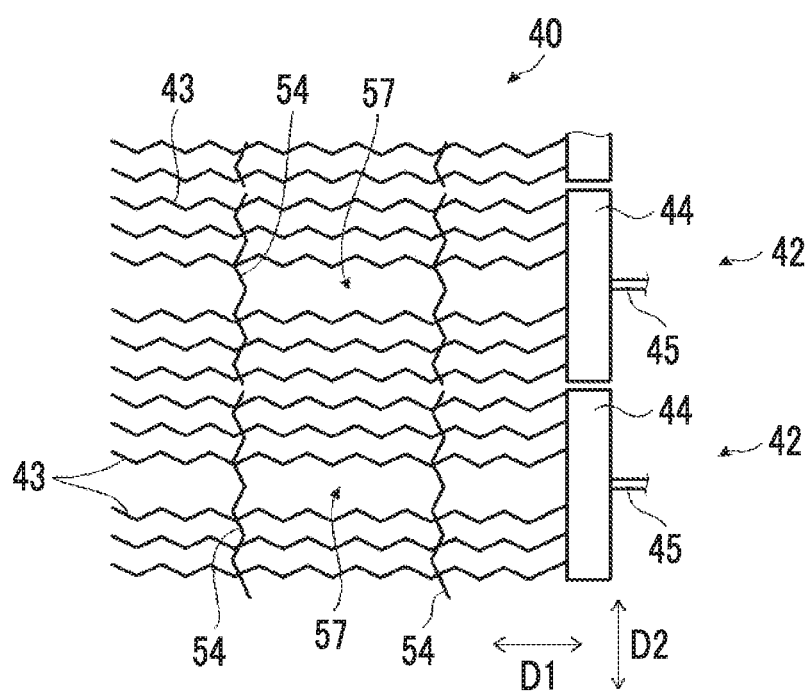
FIG. 6 is a view schematically illustrating a first example of a second electrode layer of the conductive sheet for a touch panel according to an embodiment of the invention.
Figure 7:
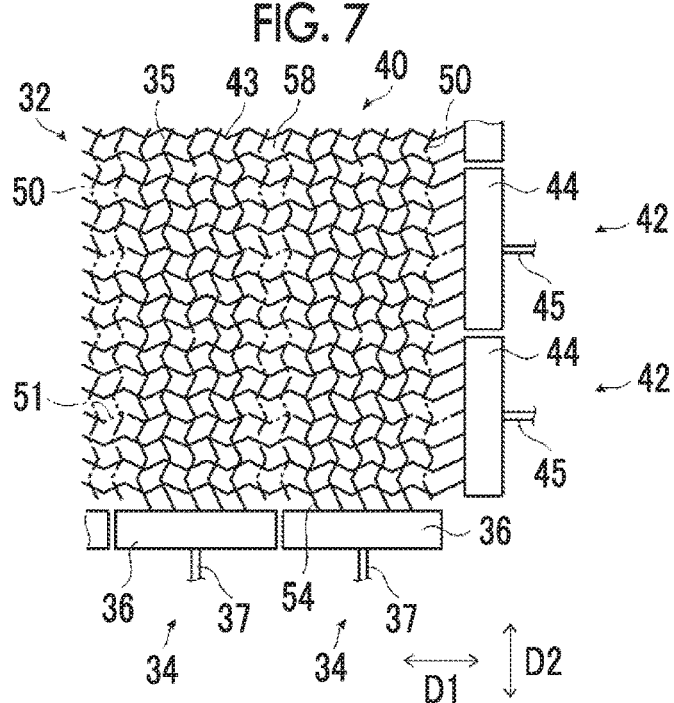
FIG. 7 is a view schematically illustrating a state in which the first example of the first electrode layer and the first example of the second electrode layer of the conductive sheet for a touch panel according to an embodiment of the invention are overlapped.

FIG. 5 is a view schematically illustrating a first example of the first electrode layer of the conductive sheet for a touch panel according to an embodiment of the invention, and FIG. 6 is a view schematically illustrating a first example of the second electrode layer of the conductive sheet for a touch panel according to an embodiment of the invention. FIG. 7 is a view schematically illustrating a state in which the first example of the first electrode layer and the first example of the second electrode layer of the conductive sheet for a touch panel according to an embodiment of the invention are overlapped.

As illustrated in FIG. 5, a first strip electrode 34 of the first electrode layer 32 has a plurality of first electrode wires 35 disposed at intervals in a first direction D1 and extending in a second direction D2 perpendicular to the first direction. The first electrode wire 35 has a bent shape. The bent shape refers to a polygonal line shape in which a plurality of linear portions having a linear shape are connected via bent portions.

In addition, the first electrode layer 32 has a plurality of first dummy wires 50 that are not electrically connected to the first electrode wires 35 between adjacent first strip electrodes 34. The first dummy wire 50 is indicated by a line differing from the first electrode wire 35 for the sake of illustration, but has the same configuration as the first electrode wire 35, except that it is not electrically connected to the first pad 36. The first dummy wire 50 also has a bent shape.

The first strip electrode 34 has a plurality of first connecting wires 51 provided at intervals in the second direction D2 and extending in the first direction D1. The first connecting wire 51 electrically connects adjacent first electrode wires 35 in one first strip electrode 34, but does not electrically connect first electrode wires 35 of adjacent first strip electrodes 34.

The first connecting wire 51 also has a bent shape.

The first electrode wire 35 has a function of detecting a touch. In addition, the first connecting wire 51 electrically connected to the first electrode wire 35 also has a function of detecting a touch.

The first dummy wire 50 corresponds to a floating wire that is not electrically connected to the first electrode wire 35, and does not detect a touch. However, the first dummy wire 50 has a function for suppressing visibility of the pattern of the strip electrodes and visibility of the electrode wires in a case where the first electrode layer 32 and the second electrode layer 40 are overlapped.

As illustrated in FIG. 6, a second strip electrode 42 of the second electrode layer 40 has a plurality of second electrode wires 43 disposed at intervals in the second direction D2 and extending in the first direction D1. The second electrode wire 43 has a bent shape. The bent shape refers to a polygonal line shape in which a plurality of linear portions having a linear shape are connected via bent portions.

The second strip electrode 42 has a plurality of second connecting wires 54 provided at intervals in the first direction D1 and extending in the second direction D2. The second connecting wire 54 electrically connects adjacent second electrode wires 43 in one second strip electrode 42, but does not electrically connect second electrode wires 43 of adjacent second strip electrodes 42. The second connecting wire 54 has the same configuration as the first electrode wire 35 and has the same bent shape as the first electrode wire 35.

The second electrode wire 43 has a function of detecting a touch. In addition, the second connecting wire 54 electrically connected to the second electrode wire 43 also has a function of detecting a touch.

In the first electrode layer 32 illustrated in FIG. 5, the first connecting wire 51 is disposed so as to be positioned in a gap 57 between the second electrode wires 43 of the second electrode layer 40 illustrated in FIG. 6.

In the second electrode layer 40 illustrated in FIG. 6, the second connecting wire 54 is disposed so as to be positioned in a gap 56 between the first electrode wires 35 of the first electrode layer 32 illustrated in FIG. 5.

As illustrated in FIG. 7, in a state in which the first electrode layer 32 and the second electrode layer 40 are overlapped, lattices 58 are formed to form a mesh-like pattern. This is provided by providing the first dummy wires 50 and the first connecting wires 51 other than the first electrode wires 35 in the first electrode layer 32 and providing the second connecting wires 54 other than the second electrode wires 43 in the second electrode layer 40. FIG. 7 illustrates a state viewed from the first electrode layer 32, that is, the touch face side.

Figure 8:
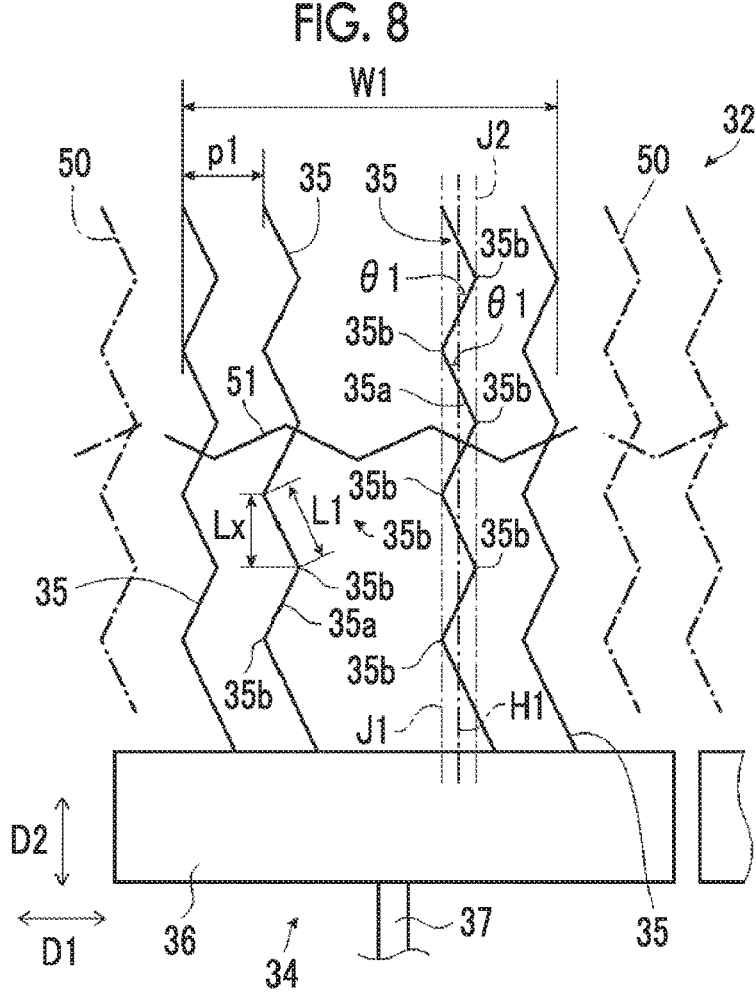
FIG. 8 is a view schematically illustrating a first strip electrode of the conductive sheet for a touch panel according to an embodiment of the invention.

As illustrated in FIG. 8, the first electrode wire 35 has a linear portion 35a and a bent portion 35b. The linear portion 35a is disposed so as to change the direction thereof for each bent portion 35b. The angle of an inner angle indicating the direction of the linear portion 35a is θ1 as an absolute value with respect to a straight line H1 parallel to the second direction D2. The first electrode wire 35 is bent between a straight line J1 parallel to the second direction D2 and a straight line J2 parallel to the second direction D2. In the example illustrated in FIG. 8, the bent portion 35b is in contact with any one of the straight lines J1 and J2.

For example, a length L1 of the linear portion 35a may be set such that a length Lx of a component in the first direction D1 in the linear portion 35a is equal to a pitch p1 between the first electrode wires 35 in the first direction D1. The pitch p1 and the angle θ1 are properly set in accordance with the position detection accuracy required for the touch panel, the pixel shape in the display panel 20, or the like. The pitch p1 is preferably in a range of 200 μm to 1,000 μm. The angle θ1 is preferably in a range of 30° to 120°, and particularly preferably 80° to 100°.

Figure 9:
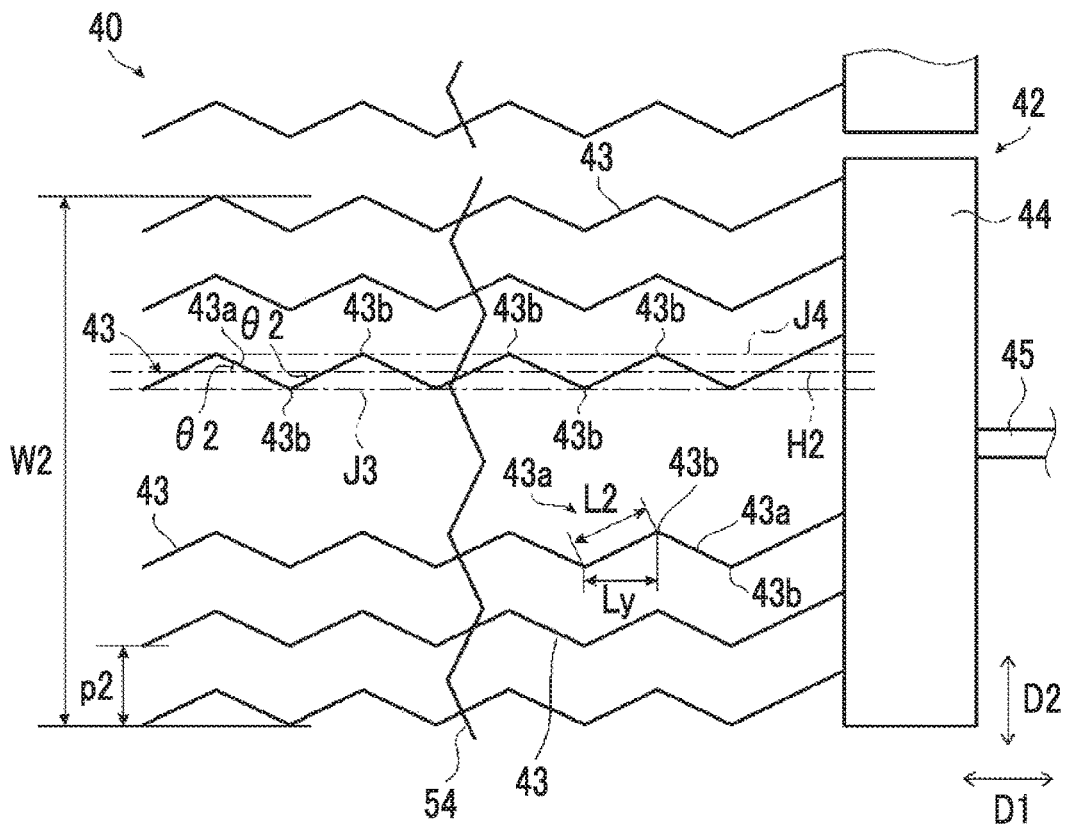
FIG. 9 is a view schematically illustrating a second strip electrode of the conductive sheet for a touch panel according to an embodiment of the invention.

As illustrated in FIG. 9, the second electrode wire 43 has a linear portion 43a and a bent portion 43b. The linear portion 43a is disposed so as to change the direction thereof for each bent portion 43b. The angle of an inner angle indicating the direction of the linear portion 43a is θ2 as an absolute value with respect to a straight line H2 parallel to the first direction D1. The second electrode wire 43 is bent between a straight line J3 parallel to the first direction D1 and a straight line J4 parallel to the first direction D1. In the example illustrated in FIG. 9, the bent portion 43b is in contact with any one of the straight lines J3 and J4.

For example, a length L2 of the linear portion 43a may be set such that a length Ly of a component in the second direction D2 in the linear portion 43a is equal to a pitch p2 between the second electrode wires 43 in the second direction D2. The pitch p2 and the angle θ2 are properly set in accordance with the position detection accuracy required for the touch panel, the pixel shape in the display panel 20, or the like. The pitch p2 is preferably in a range of 200 μm to 1,000 μm. The angle θ2 is preferably in a range of 30° to 120°, and particularly preferably 80° to 100°.

In a case where an electrode width of the first strip electrode 34 is indicated by W1 and an electrode width of the second strip electrode 42 is indicated by W2, there is at least one combination of the first strip electrode 34 and the second strip electrode 42 satisfying W1<W2 in the main sensing region 48*a* (see FIG. 2) not including the electrodes 34*a* and 42*a* disposed on the outermost sides of the plurality of first strip electrodes 34 and the plurality of second strip electrodes 42, respectively, in the sensing region 48 where the first electrode layer 32 and the second electrode layer 40 are provided.

As illustrated in FIG. 8, the electrode width W1 of the first strip electrode 34 is a distance between the outsides of the outermost electrode wires in the main sensing region 48*a* in the first direction D1 among the plurality of first electrode wires 35 connected to one first pad 36 in one first strip electrode 34. There are also the first dummy wires 50 in the first pad 36, but the first dummy wires 50 are not included in the electrode width W1.

As illustrated in FIG. 9, the electrode width W2 of the second strip electrode 42 is a distance between the outsides of the outermost electrode wires in the main sensing region 48*a* in the second direction D2 among the plurality of second electrode wires 43 connected to one second pad 41 in one second strip electrode 42.

The electrode width W1 of the first strip electrode 34 is, for example, 1 to 3 mm. The pitch p1 of the first electrode wires 35 is, for example, 100 to 3,000 μm, and preferably 200 to 1,000 μm. The electrode width W2 of the second strip electrode 42 is, for example, 2 to 4 mm. The pitch p2 of the second electrode wires 43 is, for example, 100 to 4,000 μm, and preferably 200 to 1,000 μm.

The length of one side of a lattice of the mesh-like pattern formed in a state in which the first electrode layer 32 and the second electrode layer 40 are overlapped is 50 to 500 μm, and preferably 200 to 400 μm from the viewpoint of a difficulty in visual recognition of the mesh-like pattern. For this reason, the pitch p1 between the first electrode wires 35 and the pitch p2 between the second electrode wires 43 are preferably 200 to 400 μm in a case where a mesh-like pattern having lattices 58 is formed as illustrated in FIG. 7.

Here, as illustrated in FIG. 1, the first electrode layer 32 and the second electrode layer 40 are provided at different distances from the front surface 12*a* of the cover layer 12. Accordingly, it has been found that the first electrode layer 32 and the second electrode layer 40 are different in the detection sensitivity, and thus erroneous detection may be generated with a member such as a stylus pen with a tip end that is finer than a finger. Regarding this, the detection sensitivity in the first electrode layer 32 becomes approximately equal to the detection sensitivity in the second electrode layer 40 by satisfying W1<W2 as described above, where W1 is the electrode width of the first strip electrode 34 and W2 is the electrode width of the second strip electrode 42 in the main sensing region 48*a*. Therefore, the detection sensitivity with respect to a member with a tip end that is finer than a finger is improved, and erroneous detection can be suppressed even with a member with a very fine tip end having a diameter of 2 mm.

Satisfying W1<W2 is for suppressing erroneous detection in a case where a member such as a stylus pen with a tip end that is finer than a finger is used. Accordingly, the above-described W1<W2 may be satisfied in at least the main sensing region 48*a* (see FIG. 2). The detection of a member such as a stylus pen with a fine tip end is required for a central portion in the sensing region 48. In an edge peripheral portion of the sensing region 48 excluding the main sensing region 48*a*, the detection sensitivity may be reduced due to the influence of the peripheral wires, the ground wires, and the like as described above, and there may be a setting so as not to detect a touch of a member such as a stylus pen with a tip end that is finer than a finger. In that case, the electrodes 34*a* and 42*a* at the edge peripheral portion of the sensing region 48 excluding the main sensing region 48*a* do not have to satisfy W1<W2. W1<W2 may be satisfied in the whole sensing region 48. Hereinafter, the reason for satisfying W1<W2 will be further described, where W1 is the electrode width of the first strip electrode 34 and W2 is the electrode width of the second strip electrode 42.

Figure 19:
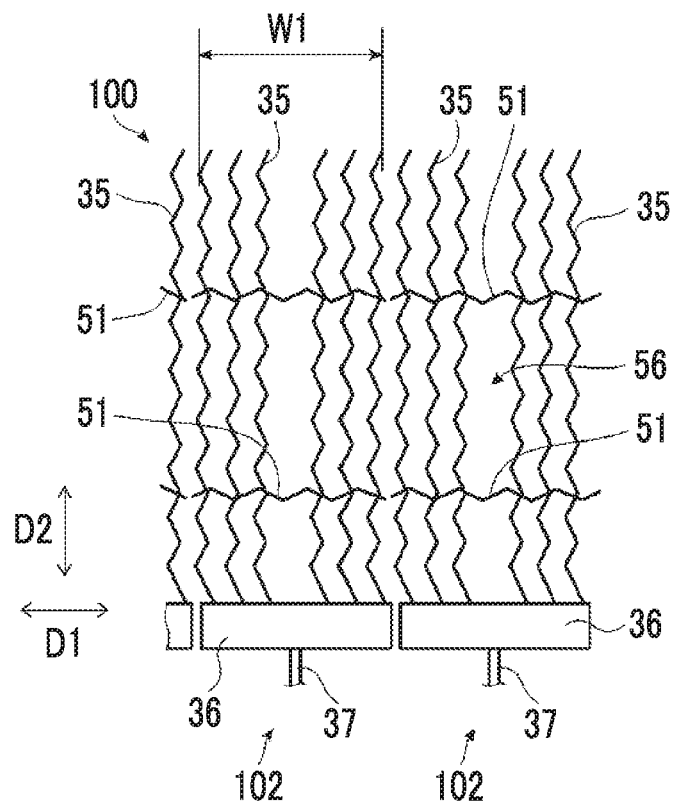
FIG. 19 is a view schematically illustrating a first electrode layer of a conventional conductive sheet for a touch panel.
Figure 20:
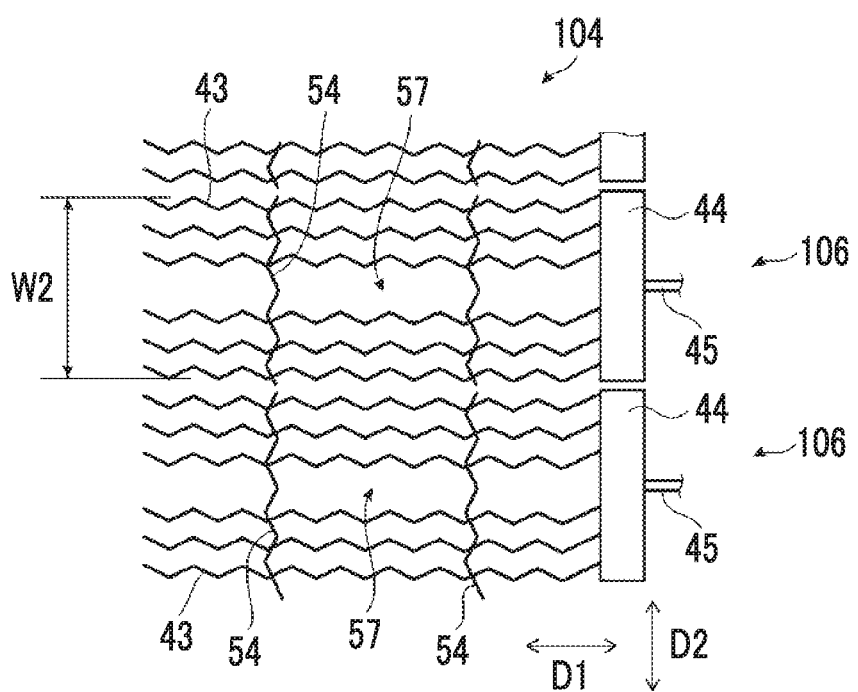
FIG. 20 is a view schematically illustrating a second electrode layer of the conventional conductive sheet for a touch panel.
Figure 21:
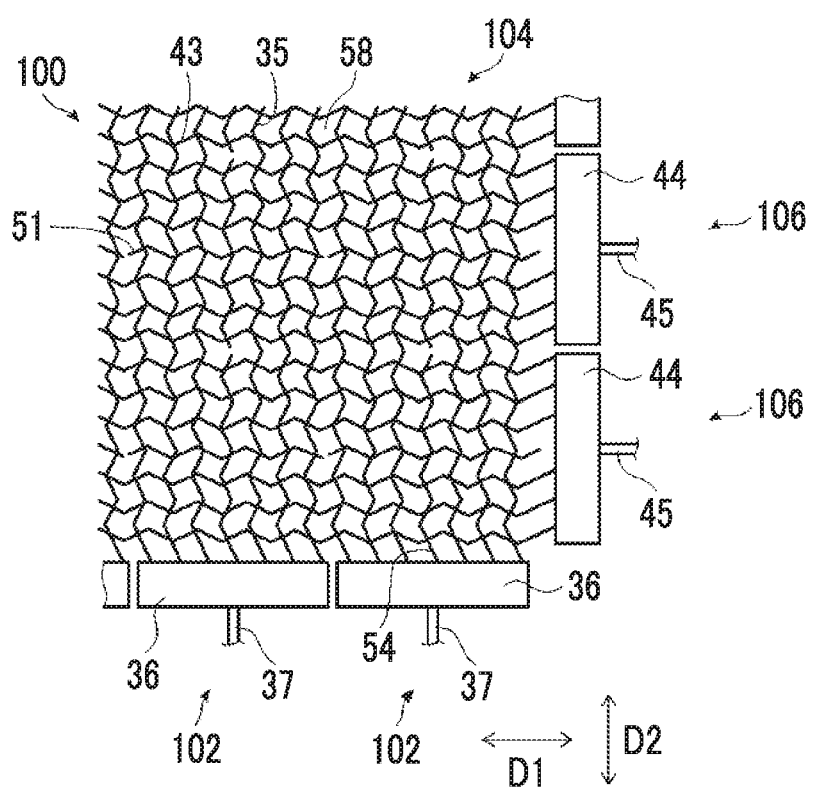
FIG. 21 is a view schematically illustrating a state in which the first electrode layer and the second electrode layer of the conventional conductive sheet for a touch panel are overlapped.

Here, FIG. 19 is a view schematically illustrating a first electrode layer of a conventional conductive sheet for a touch panel. FIG. 20 is a view schematically illustrating a second electrode layer of the conventional conductive sheet for a touch panel. FIG. 21 is a view schematically illustrating a state in which the first electrode layer and the second electrode layer of the conventional conductive sheet for a touch panel are overlapped.

In FIGS. 19 to 21, the same constituent parts as those in the configurations illustrated in FIGS. 5 to 7 will be denoted by the same references, and detailed description thereof will be omitted.

In a conventional first electrode layer 100 illustrated in FIG. 19, a plurality of first electrode wires 35 are connected to a first pad 36 in a first strip electrode 102. In addition, in a conventional second electrode layer 104 illustrated in FIG. 20, a plurality of second electrode wires 43 are connected to a second pad 44 in a second strip electrode 106. As illustrated in FIG. 21, a mesh form is made in a state in which the first electrode layer 100 and the second electrode layer 104 are overlapped. However, the electrode width W1 of the first strip electrode 34 and the electrode width W2 of the second strip electrode 42 are equal to each other, and the first strip electrode 34 and the second strip electrode 42 have the same configuration. The first electrode layer 100 and the second electrode layer 104 are different in the detection sensitivity in a case where these are provided at different distances from a front surface 12*a* of a cover layer 12, and this causes erroneous detection.

Regarding the difference in the detection sensitivity, the detection sensitivity of the electrode related to a member with a fine tip end has been found to be adjustable by a ratio of the electrode widths of the first strip electrode and the second strip electrode. Specifically, it has been found that by making the electrode width of the first strip electrode near the touch face (contact detection side) smaller than the electrode width of the second strip electrode distant from the touch face (contact detection side), the detection sensitivity of the first strip electrode and the detection sensitivity of the second strip electrode are well-balanced, and erroneous detection of a member with a fine tip end can be suppressed. Regarding the configuration of the conventional first electrode layer 100 illustrated in FIG. 19, in a case where the electrode widths of the strip electrodes are adjusted as in the configuration in which the electrode width W1 of the first strip electrode 34 is made smaller than the electrode width W2 of the second strip electrode 42 illustrated in FIG. 6 as illustrated in FIG. 5, the detection sensitivity of the first strip electrode 34 and the detection sensitivity of the second strip electrode 42 with respect to a member with a tip end that is finer than a finger are made same, and it is possible to suppress erroneous detection.

Regarding the electrode width W1 of the first strip electrode 34 and the electrode width W2 of the second strip electrode 42, W1<W2 is satisfied, but in order to keep a balance between the erroneous detection and the sensitivity, 1.0<W2/W1≤3.0 is preferably satisfied, and 1.25≤W2/W1≤12.0 is more preferably satisfied.

It is not necessary to satisfy the numerical value range of W2/W1 in the whole sensing region 48, and the first strip electrode 34 and the second strip electrode 42 satisfying W1<W2 in the main sensing region 48a preferably satisfy at least 1.0<W2/W1≤3.0 (more preferably 1.2≤W2/W1≤2.0) as described above.

Figure 10:
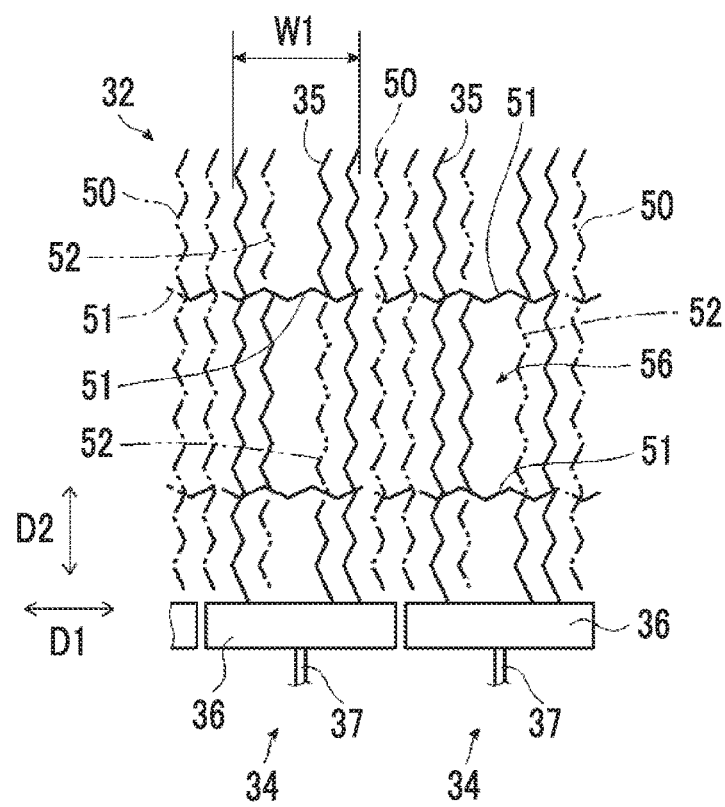
FIG. 10 is a view schematically illustrating a second example of the first electrode layer of the conductive sheet for a touch panel according to an embodiment of the invention.
Figure 11:
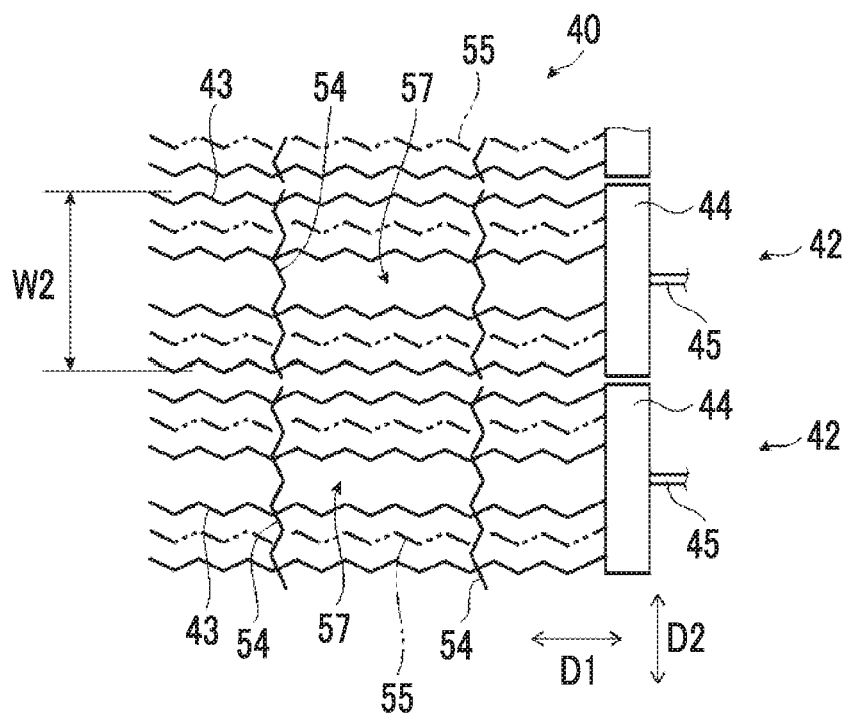
FIG. 11 is a view schematically illustrating a second example of the second electrode layer of the conductive sheet for a touch panel according to an embodiment of the invention.
Figure 12:
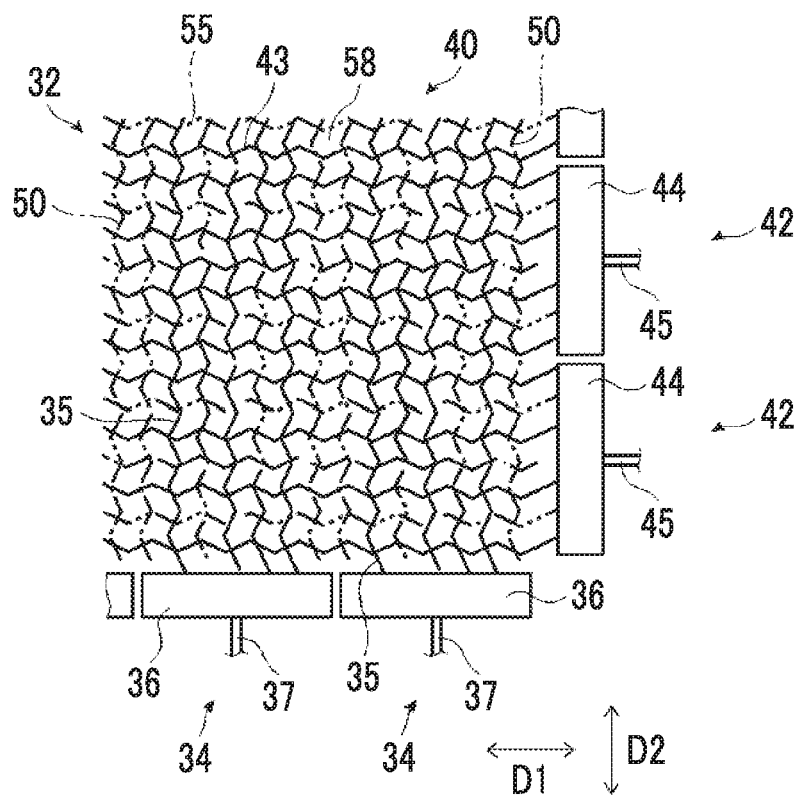
FIG. 12 is a view schematically illustrating a state in which the second example of the first electrode layer and the second example of the second electrode layer of the conductive sheet for a touch panel according to an embodiment of the invention are overlapped.

FIG. 10 is a view schematically illustrating a second example of the first electrode layer of the conductive sheet for a touch panel according to an embodiment of the invention. FIG. 11 is a view schematically illustrating a second example of the second electrode layer of the conductive sheet for a touch panel according to an embodiment of the invention. FIG. 12 is a view schematically illustrating a state in which the second example of the first electrode layer and the second example of the second electrode layer of the conductive sheet for a touch panel according to an embodiment of the invention are overlapped.

In FIGS. 10 to 12, the same constituent parts as those in the configurations illustrated in FIGS. 5 to 7 will be denoted by the same references, and detailed description thereof will be omitted.

The first strip electrode 34 of the first electrode layer 32 illustrated in FIG. 10 has the same configuration as the first strip electrode 34 of the first electrode layer 32 illustrated in FIG. 5, except that a plurality of first non-connecting wires 52 that are not electrically connected to the first electrode wires 35 are further provided in comparison to the case of the first strip electrode 34 of the first electrode layer 32 illustrated in FIG. 5. The first non-connecting wire 52 is not electrically connected to the first electrode wire 35, the first pad 36, and the first connecting wire 51, and is in an electrically floating state. For example, a first electrode wire 35 is made discontinuous to form a first non-connecting wire 52.

By providing the first non-connecting wires 52, it is possible to further adjust the detection sensitivity of the first electrode layer 32 without changing the electrode width W1. The first non-connecting wire 52 is indicated by a line differing from the first electrode wire 35 for the sake of illustration, but has the same configuration as the first electrode wire 35.

The second strip electrode 42 of the second electrode layer 40 illustrated in FIG. 11 has the same configuration as the second strip electrode 42 of the second electrode layer 40 illustrated in FIG. 6, except that a plurality of second non-connecting wires 55 that are not electrically connected to the second electrode wires 43 are further provided in comparison to the case of the second strip electrode 42 of the second electrode layer 40 illustrated in FIG. 6. The second non-connecting wire 55 is not electrically connected to the second electrode wire 43, and is in an electrically floating state. By providing the second non-connecting wires 55, it is possible to further adjust the detection sensitivity of the second electrode layer 40 without changing the electrode width W2.

The electrode width W1 of the first strip electrode 34 of the first electrode layer 32 illustrated in FIG. 10 and the electrode width W2 of the second strip electrode 42 of the second electrode layer 40 illustrated in FIG. 11 have a relation of W1<W2.

As illustrated in FIG. 12, in a case where the first electrode layer 32 and the second electrode layer 40 are overlapped, lattices 58 are formed to form a mesh-like pattern.

In a case where a total area of the first non-connecting wires 52 in the first strip electrode 34 is indicated by A1, a total area of the first electrode wires 35 and the first connecting wires 51 in the first strip electrode 34 is indicated by B1, and an occupation ratio of the first non-connecting wires 52 in the first strip electrode 34 is indicated by C1, C1=A1/(A1+B1) is satisfied.

In a case where a total area of the second non-connecting wires 55 in the second strip electrode 42 is indicated by A2, a total area of the second electrode wires 43 and the second connecting wires 54 in the second strip electrode 42 is indicated by B2, and an occupation ratio of the second non-connecting wires 55 in the second strip electrode 42 is indicated by C2, C2=A2/(A2+B2) is satisfied. The occupation ratio C1 of the first non-connecting wires 52 in the first strip electrode 34 and the occupation ratio C2 of the second non-connecting wires 55 in the second strip electrode 42 preferably satisfy C2<C1 in view of an improvement in the sensitivity with respect to a member such as a stylus pen with a tip end that is finer than a finger. In addition, 1.0<C1/C2≤3.0 is more preferably satisfied, and 1.2≤C1/C2≤2.0 is even more preferably satisfied.

Figure 13:
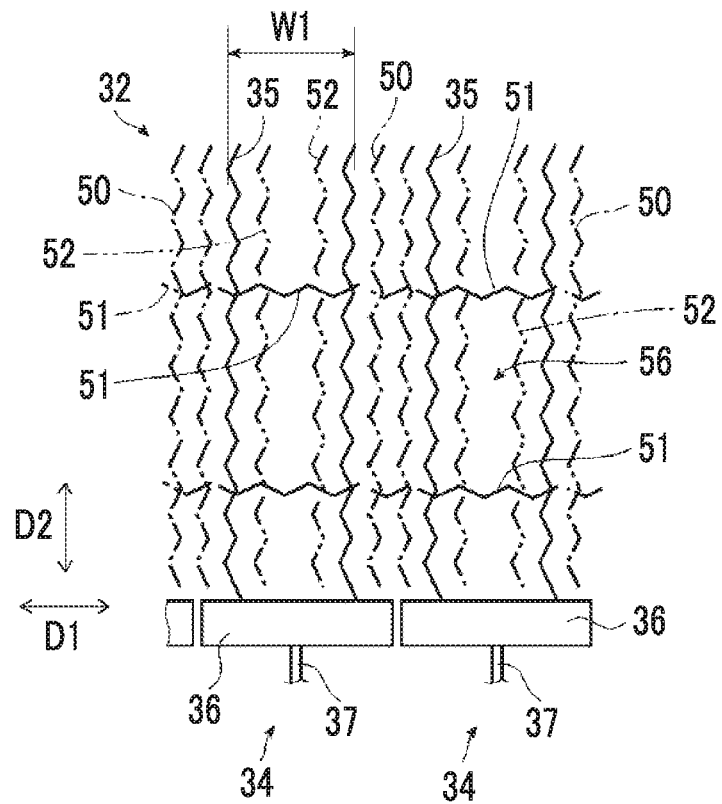
FIG. 13 is a view schematically illustrating a third example of the first electrode layer of the conductive sheet for a touch panel according to an embodiment of the invention.
Figure 14:
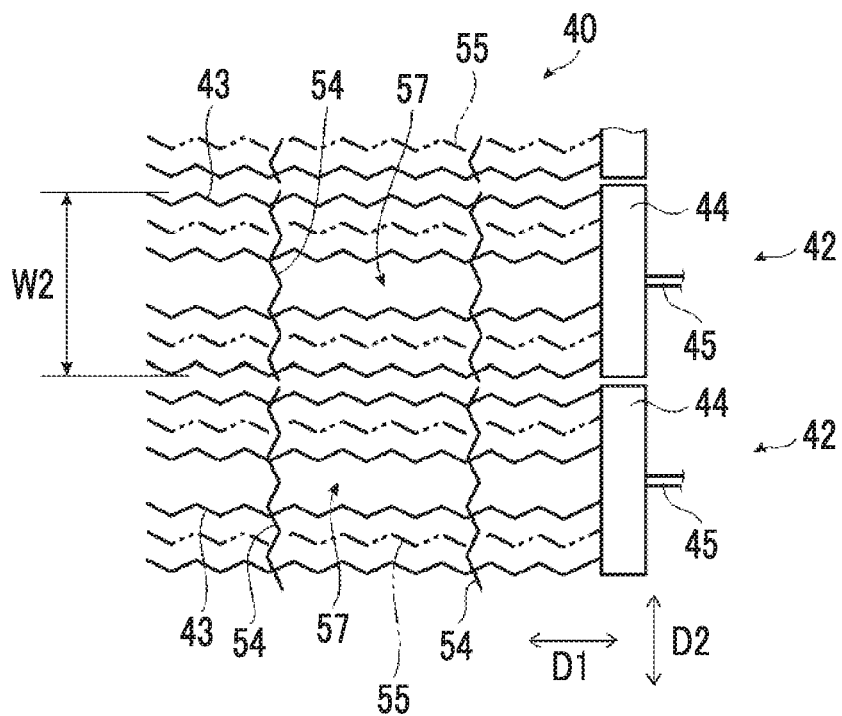
FIG. 14 is a view schematically illustrating a third example of the second electrode layer of the conductive sheet for a touch panel according to an embodiment of the invention.
Figure 15:
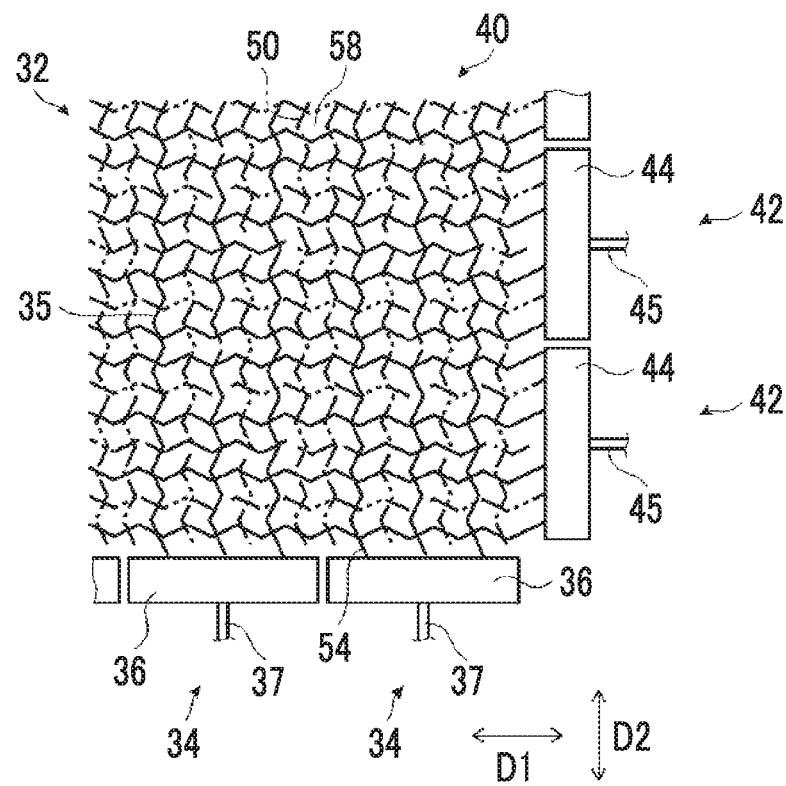
FIG. 15 is a view schematically illustrating a state in which the third example of the first electrode layer and the third example of the second electrode layer of the conductive sheet for a touch panel according to an embodiment of the invention are overlapped.

FIG. 13 is a view schematically illustrating a third example of the first electrode layer of the conductive sheet for a touch panel according to an embodiment of the invention. FIG. 14 is a view schematically illustrating a third example of the second electrode layer of the conductive sheet for a touch panel according to an embodiment of the invention. FIG. 15 is a view schematically illustrating a state in which the third example of the first electrode layer and the third example of the second electrode layer of the conductive sheet for a touch panel according to an embodiment of the invention are overlapped.

In FIGS. 13 to 15, the same constituent parts as those in the configurations illustrated in FIGS. 10 to 12 will be denoted by the same references, and detailed description thereof will be omitted.

The first strip electrode 34 of the first electrode layer 32 illustrated in FIG. 13 has the same configuration as the first strip electrode 34 of the first electrode layer 32 illustrated in FIG. 10, except that the ratio of the first non-connecting wires 52 is higher than in the first strip electrode 34 of the first electrode layer 32 illustrated in FIG. 10. In FIG. 13, two first electrode wires 35 are provided in one first strip electrode 34.

The second strip electrode 42 of the second electrode layer 40 illustrated in FIG. 14 has the same configuration as the second strip electrode 42 of the second electrode layer 40 illustrated in FIG. 11.

As illustrated in FIG. 15, in a case where the first electrode layer 32 and the second electrode layer 40 are overlapped, lattices 58 are formed to form a mesh-like pattern.

The electrode width W1 of the first strip electrode 34 of the first electrode layer 32 illustrated in FIG. 13 and the electrode width W2 of the second strip electrode 42 of the second electrode layer 40 illustrated in FIG. 14 have a relation of W1<W2.

However, the occupation ratio C1 of the first non-connecting wires 52 in the first strip electrode 34 of the first electrode layer 32 illustrated in FIG. 13 and the occupation ratio C2 of the second non-connecting wires 55 in the second strip electrode 42 of the second electrode layer 40 illustrated in FIG. 14 satisfy C2<C1. In a case of C2<C1, it is possible to increase the detection sensitivity with respect to a member such as a stylus pen with a tip end that is finer than a finger.

The occupation ratio C1 in the first strip electrode 34 illustrated in FIG. 10 is higher than that in the first strip electrode 34 illustrated in FIG. 13.

The invention is not limited to the above-described configurations as long as the first electrode wire 35 has a bent shape in the first strip electrode 34 and the second electrode wire 43 has a bent shape in the second strip electrode 42.

Figure 16:
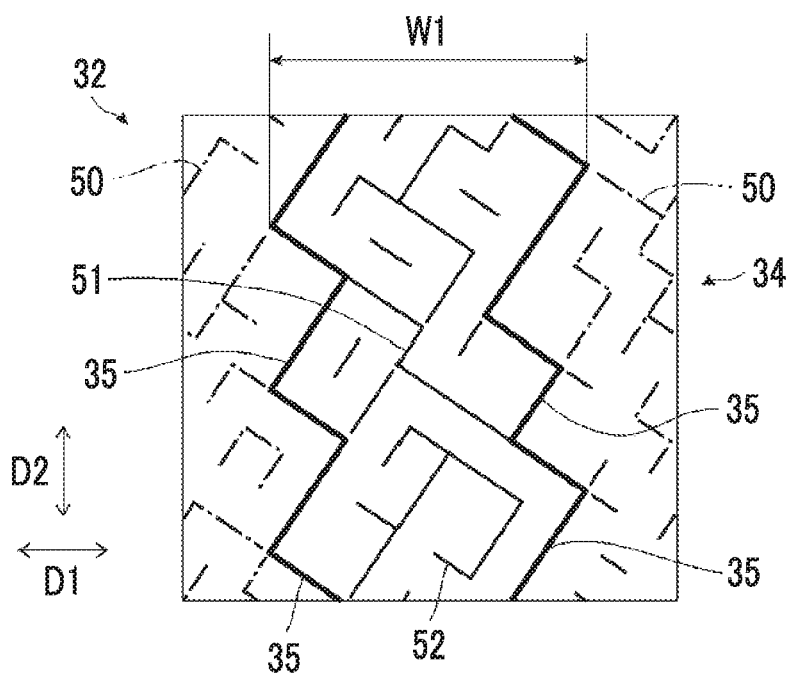
FIG. 16 is a view schematically illustrating a fourth example of the first electrode layer of the conductive sheet for a touch panel according to an embodiment of the invention.
Figure 17:
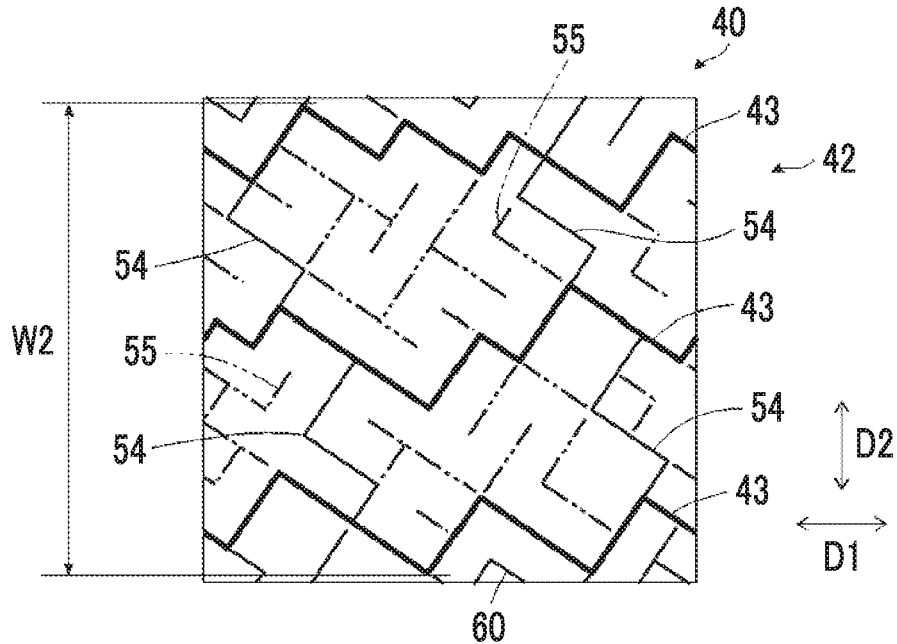
FIG. 17 is a view schematically illustrating a fourth example of the second electrode layer of the conductive sheet for a touch panel according to an embodiment of the invention.
Figure 18:
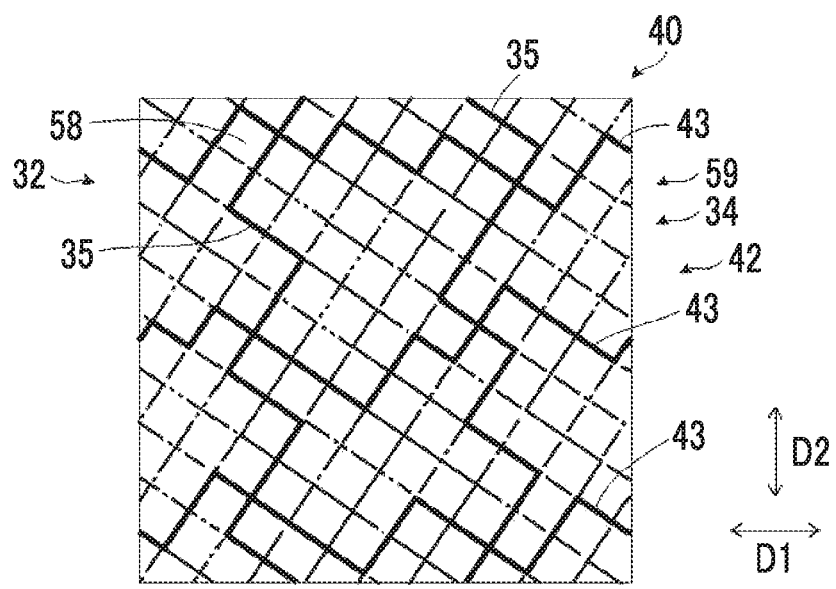
FIG. 18 is a view schematically illustrating a state in which the fourth example of the first electrode layer and the fourth example of the second electrode layer of the conductive sheet for a touch panel according to an embodiment of the invention are overlapped.

FIG. 16 is a view schematically illustrating a fourth example of the first electrode layer of the conductive sheet for a touch panel according to an embodiment of the invention. FIG. 17 is a view schematically illustrating a fourth example of the second electrode layer of the conductive sheet for a touch panel according to an embodiment of the invention. FIG. 18 is a view schematically illustrating a state in which the fourth example of the first electrode layer and the fourth example of the second electrode layer of the conductive sheet for a touch panel according to an embodiment of the invention are overlapped.

In FIGS. 16 to 18, the same constituent parts as those in the configurations illustrated in FIGS. 5 to 7 will be denoted by the same references, and detailed description thereof will be omitted. FIGS. 16 to 18 illustrate an intersection portion 59 (see FIG. 2) in which the first strip electrode 34 and the second strip electrode 42 are overlapped. In FIGS. 16 to 18, the line thickness is changed for the sake of illustration, but the line thickness has no relation with the actual thickness.

For example, two first electrode wires 35 having a bent shape are provided in the first strip electrode 34 of the first electrode layer 32 illustrated in FIG. 16, and a first connecting wire 51 is provided to connect the two first electrode wires 35. In addition, a first non-connecting wire 52 is provided between the first electrode wires 35. A first dummy wire 50 is provided around the first electrode wire 35.

For example, three second electrode wires 43 having a bent shape are provided in the second strip electrode 42 illustrated in FIG. 17, and two second connecting wires 54 are provided at intervals in the second direction D2 to connect the three second electrode wires 43. In addition, a second non-connecting wire 55 is provided between the second electrode wires 43. A second dummy wire 60 disposed between adjacent second strip electrodes 42 and insulated from the second electrode wire 43 is provided around the second electrode wire 43.

As illustrated in FIG. 18, in a case where the first electrode layer 32 and the second electrode layer 40 are overlapped, lattices 58 are formed in intersection portions 59 (see FIG. 2) to form a mesh-like pattern. The fourth example shows a mesh-like pattern in which square lattices of the same shape are disposed, but the lattice shape may be a rhombus, a regular hexagon, or an equilateral triangle.

The arrangement pattern of the first electrode wire 35, the first dummy wire 50, the first connecting wire 51, and the first non-connecting wire 52 in the first strip electrode 34, and the arrangement pattern of the second electrode wire 43, the second connecting wire 54, the second non-connecting wire 55, and the second dummy wire 60 in the second strip electrode 42 are determined by satisfying W1<W2, where W1 is the electrode width of the first strip electrode 34 and W2 is the electrode width of the second strip electrode 42. Alternatively, these may be determined by a mesh-like pattern formed at the intersection portions 59 where the first strip electrodes 34 and the second strip electrodes 42 are overlapped.

The electrode width W1 of the first strip electrode 34 illustrated in FIG. 16 and the electrode width W2 of the second strip electrode 42 illustrated in FIG. 17 satisfy W1<W2. Furthermore, the occupation ratio C1 of the first non-connecting wires 52 and the occupation ratio C2 of the second non-connecting wires preferably satisfy C2<C1. In this case, C2<C1 can be satisfied by increasing the ratio of the first non-connecting wires 52 or reducing the ratio of the second non-connecting wires 55.

In the first electrode layer 32, the first electrode wire 35 is preferably a thin metallic wire having a line width of 10 μm or less, and in the second electrode layer 40, the second electrode wire 43 is preferably a thin metallic wire having a line width of 10 μm or less. It is particularly preferable that the first electrode wire 35 and the second electrode wire 43 have the same line width, and the line width is equal to or more than 1.0 μm and equal to or less than 5.0 μm. Here, the same line width means that the line width is within a range of ±10%. Accordingly, in a case where the line width is 5.0 μm, wires having a line width of 4.5 μm to 5.5 μm are regarded to have the same line width.

In addition, it is preferable that the first electrode wire 35, the first dummy wire 50, the first non-connecting wire 52, the first connecting wire 51, the second electrode wire 43, the second non-connecting wire 55, the second connecting wire 54, and the second dummy wire 60 have the same line width, and the line width is 5 μm or less. The line width is particularly preferably equal to or more than 1.0 μm and equal to or less than 5.0 μm. Here, the same line width means that the line width is within a range of ±10%. Accordingly, in a case where the line width is 5.0 μm, wires having a line width of 4.5 μm to 5.5 μm are regarded to have the same line width.

The line widths of the wires in the first electrode layer 32 and the second electrode layer 40 described above are all average values.

Hereinafter, the first electrode wire 35, the first dummy wire 50, the first non-connecting wire 52, the first connecting wire 51, the second electrode wire 43, the second non-connecting wire 55, and the second connecting wire 54 are also collectively called wires simply.

Regarding the line widths of the wires in the first electrode layer 32 and the second electrode layer 40 described above, first, an image of an object wire is acquired in a direction vertical to the front surface 30a of the transparent insulating base 30, and taken into a personal computer to extract the wire. A line width is obtained along the extracted wire, and a plurality of line widths are obtained to obtain an average line width of a plurality of wires. This average value is set as a line width.

The thickness of the wires in the first electrode layer 32 and the second electrode layer 40 described above is not particularly limited, but preferably 0.05 to 10 μm, and most preferably 0.1 to 1 μm. In a case where the thickness is within the above-described range, a wire having a low resistance and excellent durability can be relatively easily formed.

In measuring the thickness of the wires, a cross-sectional image of a wire that is a measurement object is acquired, taken into a personal computer, and displayed on a monitor. At two places specifying the thickness of the wire that is a measurement object, horizontal lines are respectively drawn, and a length between the horizontal lines is obtained. Accordingly, the thickness of the wire that is a measurement object can be obtained.

Hereinafter, the members of a touch panel will be described.

First, the first electrode wire, the first dummy wire, the first non-connecting wire, the first connecting wire, the second electrode wire, the second non-connecting wire, and the second connecting wire will be described.

<First Electrode Wire, First Dummy Wire, First Non-Connecting Wire, First Connecting Wire, Second Electrode Wire, Second Non-Connecting Wire, and Second Connecting Wire>

Each of the first electrode wire 35, the first dummy wire 50, the first non-connecting wire 52, the first connecting wire 51, the second electrode wire 43, the second non-connecting wire 55, and the second connecting wire 54 described above has electric conductivity, and is formed of, for example, a thin metallic wire as described above. The thin metallic wire is made of, for example, a metal or an alloy, and can be made of copper, aluminum, silver, or an alloy thereof. From the viewpoint of a resistance value, the thin metallic wire preferably contains copper or silver. In addition, the thin metallic wire may contain metallic particles and a binder, for example, metallic silver and a polymer binder such as gelatin or acrylic styrene-based latex.

The thin metallic wire is not limited to the above-described wire made of a metal or an alloy, and may contain, for example, metal oxide particles, a metal paste such as a silver paste and a copper paste, and metal nanowire particles such as silver nanowire and copper nanowire.

In addition, the thin metallic wire may have a single layer structure or a multilayer structure. The thin metallic wire may have, for example, a structure in which a copper oxynitride layer, a copper layer, and a copper oxynitride layer are laminated in order, or a structure in which molybdenum (Mo), aluminum (Al), and molybdenum (Mo) are laminated in order.

In order to reduce the reflectivity of the thin metallic wire, a blackening treatment may be performed to sulfurize or oxidize a surface of the thin metallic wire. Furthermore, a blackened layer may be provided to make the thin metallic wire hard to view. The blackened layer reduces, for example, the reflectivity of the thin metallic wire. The blackened layer can be made of copper nitride, copper oxide, copper oxynitride, AgO, Pd, carbon, or other nitride or oxide. The blackened layer is disposed on the visual recognition side of the thin metallic wire, that is, on the touch face side.

Next, a method of manufacturing the first electrode wire 35, the first dummy wire 50, the first non-connecting wire 52, the first connecting wire 51, the second electrode wire 43, the second non-connecting wire 55, and the second connecting wire 54 provided in the first electrode layer 32 and the second electrode layer 40 described above will be described.

<Manufacturing Method>

The method of manufacturing the first electrode wire 35, the first dummy wire 50, the first non-connecting wire 52, the first connecting wire 51, the second electrode wire 43, the second non-connecting wire 55, and the second connecting wire 54 provided in the first electrode layer 32 and the second electrode layer 40 is not particularly limited as long as wire formation is possible on the transparent insulating base 30 or the like. A plating method described in JP2014-159620A or JP2012-144761A, a silver salt method described in JP2015-022597A, a vapor deposition method described in JP2014-029614A, a printing method using a conductive ink described in JP2011-028985A, or the like can be properly used.

<First Peripheral Wiring Portion and Second Peripheral Wiring Portion>

The line widths (line) of the first peripheral wire 37 and the second peripheral wire 45 respectively formed in the first peripheral wiring portion 38 and the second peripheral wiring portion 46 are preferably 50 µm or less, more preferably 30 µm or less, and particularly preferably 15 µm or less. The interval (space) between the first peripheral wires 37 and the interval (space) between the second peripheral wires 45 are preferably 50 µm or less, more preferably 30 µm or less, and particularly preferably 15 µm or less. Since the areas of the first peripheral wiring portion 38 and the second peripheral wiring portion 46 can be reduced, it is preferable that the line width and the interval are within the above-described ranges, respectively.

The first peripheral wire 37 and the second peripheral wire 45 can also be formed by the above-described wire manufacturing method. The first peripheral wire 37 and the first strip electrode 34 can be simultaneously formed with the same material through the same process. The second peripheral wire 45 and the second strip electrode 42 can also be simultaneously formed with the same material through the same process.

<Transparent Insulating Base>

The kind of the transparent insulating bases 30 and 31 is not particularly limited as long as the first electrode layer 32 and the second electrode layer 40 can be provided. Examples of the material of the transparent insulating bases 30 and 31 include a transparent resin material and a transparent inorganic material.

Specific examples of the transparent resin material include acetyl cellulose-based resins such as triacetyl cellulose, polyester-based resins such as polyethylene terephthalate (PET) and polyethylene naphthalate (PEN), olefin-based resins such as polyethylene (PE), polymethylpentene, cycloolefin polymer (COP), and cycloolefin copolymer (COC), acryl-based resins such as polymethyl methacrylate, polyether sulfone, polycarbonate, polysulfone, polyether, polyether ketone, acrylonitrile, and methacrylonitrile. The thickness of the transparent resin material is preferably 20 to 200 µm.

Specific examples of the transparent inorganic material include glass such as alkali-free glass, alkali glass, chemically reinforced glass, soda glass, potash glass, and lead glass, ceramics such as translucent piezoelectric ceramics (lanthanum lead titanate zirconate (PLZT)), quartz, fluorite, and sapphire. The thickness of the transparent inorganic material is preferably 0.1 to 1.3 mm.

As another preferable aspect of the transparent insulating bases 30 and 31, an underlayer containing a polymer is preferably provided on the surface on which the first electrode layer 32 and the second electrode layer 40 are provided. The adhesion between the first and second electrode layers 32 and 40 and the transparent insulating bases 30 and 31 is further improved by forming the first electrode layer 32 and the second electrode layer 40 on the underlayer.

The method of forming an underlayer is not particularly limited, and examples thereof include a method including: applying an underlayer forming composition containing a polymer to a substrate; and performing a heating treatment as necessary. The underlayer forming composition may contain a solvent as necessary. The kind of the solvent is not particularly limited. As the underlayer forming composition containing a polymer, gelatin, an acrylic resin, a urethane resin, or acrylic styrene-based latex containing inorganic or polymer fine particles may be used.

The thickness of the underlayer is not particularly limited. In view of more excellent adhesion between the first and second electrode layers 32 and 40 and the transparent insulating base 30, the thickness is preferably 0.02 to 2.0 μm, and more preferably 0.03 to 1.5 μm.

Other than the above-described underlayer, for example, an ultraviolet absorbing layer may be provided as necessary as another layer between the transparent insulating base 30 and the first electrode layer 32 or the second electrode layer 40.

The following functional films may be further formed as necessary.

<Protective Layer>

A transparent protective layer may be formed on the first electrode wires 35 and the second electrode wires 43. An organic film such as gelatin, an acrylic resin, a urethane resin, or acrylic styrene-based latex, or an inorganic film such as silicon dioxide can be used as the protective layer, and the film thickness is preferably 10 nm to 10,000 nm.

A transparent coat layer may be formed on the protective layer as necessary. An organic film such as an acrylic resin or a urethane resin is used as the transparent coat layer. The transparent coat layer is formed in the sensing region 48, and the film thickness is 1 μm to 100 μm.

<Peripheral Wiring Insulating Film>

A peripheral wiring insulating film may be formed on the first peripheral wires 37 and the second peripheral wires 45 illustrated in FIG. 2 in order to prevent migration and corrosion of the peripheral wires. An organic film such as an acrylic resin or a urethane resin is used as the peripheral wiring insulating film, and the film thickness is preferably 1 μm to 30 μm. The peripheral wiring insulating film may be formed only on the first peripheral wires 37 or the second peripheral wires 45.

Basically, the invention is constituted as above. The touch panel and the conductive sheet for a touch panel according to the embodiment of the invention have been described in detail, but the invention is not limited to the above-described embodiments. Needless to say, various modifications or changes may be made without departing from the gist of the invention.

EXAMPLES

Hereinafter, characteristics of the invention will be described in more detail with examples. The materials, reagents, amounts, substance amounts, ratios, treatment contents, treatment procedures, and the like shown in the following examples can be properly changed without departing from the intent of the invention. Accordingly, the scope of the invention is not restrictively interpreted by the following specific examples.

In the examples, the electrode pattern and the size of a first electrode layer and a second electrode layer were changed in relation to a touch panel configuration to produce the following Examples 1 to 11, 21 to 28, 31 to 38, and 41 to 44, and Comparative Examples 1 and 2, and sensitivity was evaluated for each of the examples.

Regarding Examples 1 to 11, 21 to 28, 31 to 38, and 41 to 44, and Comparative Examples 1 and 2, the electrode pattern and the size of the first electrode layer and the second electrode layer are shown in the following Table 1, and results of the sensitivity evaluation are also shown in the following Table 1. In the examples, a touch panel 16 having the configuration illustrated in FIG. 1 was used as a touch panel.

Hereinafter, Examples 1 to 11, 21 to 28, 31 to 38, and 41 to 44, and Comparative Examples 1 and 2 will be described.

In Examples 1 to 11, the first electrode layer had a configuration illustrated in FIG. 5 and the second electrode layer had a configuration illustrated in FIG. 6. An electrode pattern of the first electrode layer illustrated in FIG. 5 and the second electrode layer illustrated in FIG. 6 is referred to as a first pattern.

In Examples 21 to 28, the first electrode layer had a configuration illustrated in FIG. 10 and the second electrode layer had a configuration illustrated in FIG. 11. An electrode pattern of the first electrode layer illustrated in FIG. 10 and the second electrode layer illustrated in FIG. 11 is referred to as a second pattern.

In Examples 31 to 38, the first electrode layer had a configuration illustrated in FIG. 13 and the second electrode layer had a configuration illustrated in FIG. 14. An electrode pattern of the first electrode layer illustrated in FIG. 13 and the second electrode layer illustrated in FIG. 14 is referred to as a third pattern.

In Examples 41 to 44, the first electrode layer had a configuration illustrated in FIG. 16 and the second electrode layer had a configuration illustrated in FIG. 17. An electrode pattern of the first electrode layer illustrated in FIG. 16 and the second electrode layer illustrated in FIG. 17 is referred to as a fourth pattern.

In Comparative Examples 1 and 2, the first electrode layer had a configuration illustrated in FIG. 19 and the second electrode layer had a configuration illustrated in FIG. 20. An electrode pattern of the first electrode layer illustrated in FIG. 19 and the second electrode layer illustrated in FIG. 20 is referred to as a fifth pattern.

In Examples 1 to 11, 21 to 28, 31 to 38, and 41 to 44 and Comparative Examples 1 and 2, all wires had a line width of 4 μm.

In the configuration of the touch panel, reinforced glass having a thickness of 0.4 mm was used as a cover layer. An optically transparent pressure sensitive adhesive (optical clear adhesive, OCA, 8146-4 (product No.) manufactured by 3M, thickness: 75 μm) was used as a transparent layer between the cover layer and the conductive sheet for a touch panel.

The first electrode layer was configured using wires having a lamination structure of a copper oxynitride layer having a thickness of 38 nm, a copper layer having a thickness of 500 nm, and a copper oxynitride layer having a thickness of 38 nm.

The second electrode layer was configured using wires having a lamination structure of a copper oxynitride layer having a thickness of 38 nm, a copper layer having a thickness of 500 nm, and a copper oxynitride layer having a thickness of 38 nm.

A cycloolefin polymer (COP) base having a thickness of 50 μm was used as a transparent insulating base.

A method of manufacturing the touch panel will be described.

A cycloolefin polymer base (hereinafter, simply referred to as a base) having a thickness of 50 μm was prepared as a transparent insulating base. An underlayer formed of an acrylic resin having a thickness of 1.2 μm was formed using a coating liquid on a first surface and a second surface of the base.

On the underlayer of the first surface of the base, a lower copper oxynitride layer having a thickness of 38 nm was formed using a sputtering method. Next, a copper layer having a thickness of 500 nm was formed using a sputtering method on the lower copper oxynitride layer. Furthermore, an upper copper oxynitride layer having a thickness of 38 nm was formed using a sputtering method on the copper layer to form a first conductive layer formed of the copper oxynitride layer, the copper layer, and the copper oxynitride layer.

Similarly to the first conductive layer, a lower copper oxynitride layer having a thickness of 38 nm was formed using a sputtering method on the underlayer of the second surface of the base. Next, a copper layer having a thickness of 500 nm was formed using a sputtering method on the lower copper oxynitride layer. Furthermore, an upper copper oxynitride layer having a thickness of 38 nm was formed using a sputtering method on the copper layer to form a second conductive layer formed of the copper oxynitride layer, the copper layer, and the copper oxynitride layer, and a conductive laminate for a touch panel was formed.

Next, a resist was applied to both of the first conductive layer and the second conductive layer of the conductive laminate for a touch panel, exposure was performed via an exposure mask from the both surfaces of the conductive laminate for a touch panel, and development was performed to form a resist pattern having an electrode pattern and a peripheral wiring pattern on both surfaces.

Next, using a ferric chloride solution as an etching solution, the first and second conductive layers, each formed of the copper oxynitride layer, the copper layer, and the copper oxynitride layer, were etched. The resist was peeled using a peeling solution to form a first electrode layer and a second electrode layer, and a conductive sheet for a touch panel was produced.

Using any one of the above-described first to fifth patterns as the pattern of the exposure mask, various patterns of electrode wires and non-connecting wires of first and second strip electrodes were produced. As described above, the electrode wires, connecting wires, dummy wires, and non-connecting wires had a line width of 4 μm.

The produced conductive sheet for a touch panel and a cover layer were bonded to each other using the above-described optically transparent pressure sensitive adhesive. The resulting product was connected to a controller, and a touch panel was produced.

An electrode width of the first strip electrode indicated by W1 and an electrode width of the second strip electrode indicated by W2 were described in Table 1. In a case where non-connecting wires were provided, an occupation ratio of the first non-connecting wires indicated by C1 and an occupation ratio of the second non-connecting wires indicated by C2 were described in Table 1.

Sensitivity was evaluated as follows.

Using a probe robot, a stylus pen having a tip end diameter of 2 mm was brought into contact with 10,000 positions previously set on a surface of the touch panel in order, and each touch position was detected. Results of the detection of the 10,000 positions and set values corresponding thereto were compared. Using a 9973-th value from a minimum absolute value of a differential vector between the detected position and the set position, sensitivity was evaluated based on the following evaluation standards.

"AA": The above-described 9973-th value is less than 0.5 mm.

"A": The above-described 9973-th value is equal to or greater than 0.5 mm and less than 1.0 mm.

"B": The above-described 9973-th value is equal to or greater than 1.0 mm and less than 2.0 mm.

"C": The above-described 9973-th value is equal to or greater than 2.0 mm.

The evaluation level "C" is a level at which erroneous detection frequently occurs with a stylus pen having a tip end diameter of 2 mm, and thus a problem occurs in practical use. The evaluation level "B" is a level at which no problem occurs in practical use with less erroneous detection. The evaluation levels "A" and "AA" are a very excellent level with no erroneous detection.

TABLE 1

|  | Electrode Pattern | W1 (mm) | W2 (mm) | W2/W1 | Non-Connecting Wires | C1 | C2 | C1/C2 | Result of Sensitivity Evaluation |
|---|---|---|---|---|---|---|---|---|---|
| Example 1 | First Pattern | 2.00 | 3.00 | 1.50 | None | — | — | — | A |
| Example 2 | First Pattern | 1.00 | 3.00 | 3.00 | None | — | — | — | B |
| Example 3 | First Pattern | 1.20 | 3.00 | 2.50 | None | — | — | — | A |
| Example 4 | First Pattern | 1.50 | 3.00 | 2.00 | None | — | — | — | A |
| Example 5 | First Pattern | 2.50 | 3.00 | 1.20 | None | — | — | — | A |
| Example 6 | First Pattern | 3.50 | 4.00 | 1.14 | None | — | — | — | B |
| Example 7 | First Pattern | 3.00 | 4.00 | 1.33 | None | — | — | — | A |
| Example 8 | First Pattern | 2.50 | 4.00 | 1.60 | None | — | — | — | A |
| Example 9 | First Pattern | 2.20 | 4.00 | 1.82 | None | — | — | — | A |
| Example 10 | First Pattern | 1.60 | 4.00 | 2.50 | None | — | — | — | A |
| Example 11 | First Pattern | 1.40 | 4.00 | 2.86 | None | — | — | — | B |
| Example 21 | Second Pattern | 2.00 | 3.00 | 1.50 | Presence | 0.20 | 0.24 | 0.85 | AA |
| Example 22 | Second Pattern | 2.50 | 3.00 | 1.20 | Presence | 0.25 | 0.29 | 0.88 | A |
| Example 23 | Second Pattern | 1.00 | 3.00 | 3.00 | Presence | 0.33 | 0.43 | 0.78 | B |
| Example 24 | Second Pattern | 2.00 | 3.60 | 1.80 | Presence | 0.33 | 0.40 | 0.83 | AA |
| Example 25 | Second Pattern | 1.60 | 3.60 | 2.25 | Presence | 0.40 | 0.50 | 0.80 | AA |
| Example 26 | Second Pattern | 3.50 | 4.00 | 1.14 | Presence | 0.38 | 0.44 | 0.84 | A |
| Example 27 | Second Pattern | 1.60 | 4.00 | 2.50 | Presence | 0.40 | 0.45 | 0.88 | AA |
| Example 28 | Second Pattern | 2.50 | 4.00 | 1.60 | Presence | 0.33 | 0.33 | 1.00 | AA |
| Example 31 | Third Pattern | 2.00 | 3.00 | 1.50 | Presence | 0.40 | 0.24 | 1.70 | AA |
| Example 32 | Third Pattern | 2.50 | 3.00 | 1.20 | Presence | 0.50 | 0.29 | 1.75 | AA |
| Example 33 | Third Pattern | 1.00 | 3.00 | 3.00 | Presence | 0.33 | 0.29 | 1.17 | A |
| Example 34 | Third Pattern | 2.00 | 3.60 | 1.80 | Presence | 0.50 | 0.30 | 1.67 | AA |
| Example 35 | Third Pattern | 1.60 | 3.60 | 2.25 | Presence | 0.40 | 0.30 | 1.33 | AA |
| Example 36 | Third Pattern | 3.50 | 4.00 | 1.14 | Presence | 0.50 | 0.33 | 1.50 | AA |
| Example 37 | Third Pattern | 1.60 | 4.00 | 2.50 | Presence | 0.40 | 0.27 | 1.47 | AA |
| Example 38 | Third Pattern | 2.50 | 4.00 | 1.60 | Presence | 0.50 | 0.33 | 1.50 | AA |
| Example 41 | Fourth Pattern | 2.70 | 4.00 | 1.48 | Presence | 0.45 | 0.44 | 1.01 | AA |
| Example 42 | Fourth Pattern | 2.50 | 4.00 | 1.60 | Presence | 0.47 | 0.43 | 1.10 | AA |
| Example 43 | Fourth Pattern | 2.20 | 4.00 | 1.82 | Presence | 0.47 | 0.43 | 1.10 | AA |

TABLE 1-continued

|  | Electrode Pattern | W1 (mm) | W2 (mm) | W2/W1 | Non-Connecting Wires | C1 | C2 | C1/C2 | Result of Sensitivity Evaluation |
|---|---|---|---|---|---|---|---|---|---|
| Example 44 | Fourth Pattern | 1.80 | 4.00 | 2.22 | Presence | 0.47 | 0.43 | 1.10 | AA |
| Comparative Example 1 | Fifth Pattern | 3.00 | 3.00 | 1.00 | None | — | — | — | C |
| Comparative Example 2 | Fifth Pattern | 3.00 | 2.00 | 0.67 | None | — | — | — | C |

As shown in Table 1, Examples 1 to 11, 21 to 28, 31 to 38, and 41 to 44 had good sensitivity with respect to a stylus pen having a tip end diameter of 2 mm, and were capable of suppressing erroneous detection in a case where a stylus pen having a tip end diameter of 2 mm was used, as compared with Comparative Examples 1 and 2.

All of Examples 1 to 11 had the first pattern, and the sensitivity was slightly lower in Example 6 in which the value of W2/W1 was relatively small and in Examples 2 and 11 in which the value of W2/W1 was relatively large.

All of Examples 21 to 28 had the second pattern, and the sensitivity was slightly lower in Example 23 in which the value of W2/W1 was relatively large. In Example 26 in which the value of W2/W1 was the same as that of Example 6, the sensitivity evaluation result was improved by providing the second pattern having non-connecting wires.

All of Examples 31 to 38 had the third pattern, and it was possible to obtain good sensitivity even in Example 36 in which the value of W2/W1 was relatively small and in Example 33 in which the value of W2/W1 was relatively large. In Example 33 in which the value of W2/W1 was the same as that of Example 23 and in Example 36 in which the value of W2/W1 was the same as that of Example 26, the sensitivity evaluation result was improved by making the value of C1/C2 larger than 1, that is, by providing the third pattern in which C1<C2 was satisfied.

Other aspects are as follows.

A conductive member having a first electrode layer and a second electrode layer that is disposed to be opposed to the first electrode layer in an insulated state, in which the first electrode layer is disposed on a contact detection side, the first electrode layer is provided with a plurality of first strip electrodes that are disposed at intervals in a first direction and extend in a second direction perpendicular to the first direction, the first strip electrode has a plurality of first electrode wires having a bent shape that are disposed at intervals in the first direction and extend in the second direction perpendicular to the first direction, and a first pad to which the plurality of first electrode wires are electrically connected, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, and a second pad to which the plurality of second electrode wires are electrically connected, and in a case where an electrode width of the first strip electrode is indicated by W1 and an electrode width of the second strip electrode is indicated by W2, there is at least one combination of the first strip electrode and the second strip electrode satisfying W1<W2 in a main sensing region not including electrodes disposed on outermost sides of the plurality of first strip electrodes and electrodes disposed on outermost sides of the plurality of second strip electrodes in a region where the first electrode layer and the second electrode layer are provided.

The conductive member can be configured as an electrode. The conductive member may be a conductive film, and a conductive sheet includes a conductive film.

EXPLANATION OF REFERENCES

10: conductive sheet for touch panel
12: cover layer
12a: front surface
13: touch sensor
14: controller
15: transparent layer
16: touch panel
18: transparent layer
20: display panel
30, 31: transparent insulating base
30a, 31a: front surface
30b, 31b: rear surface
30c: one side
32: first electrode layer
34: first strip electrode
34a: electrode disposed on outermost side of first strip electrodes
35: first electrode wire
35a, 43a: linear portion
35b, 43b: bent portion
36: first pad
37: first peripheral wire
38: first peripheral wiring portion
39, 47: terminal connection region
40: second electrode layer
42: second strip electrode
42a: electrode disposed on outermost side of second strip electrodes
43: second electrode wire
44: second pad
45: second peripheral wire
46: second peripheral wiring portion
48: sensing region
48a: main sensing region
49: transparent adhesive layer
50: first dummy wire
51: first connecting wire
52: first non-connecting wire
54: second connecting wire
55: second non-connecting wire
56, 57: gap
58: lattice
59: intersection portion
60: second dummy wire
100: first electrode layer
102: first strip electrode 104: second electrode layer
106: second strip electrode
300: transparent insulating member
D1: first direction
D2: second direction
Dn: direction
H1, H2, J1, J2, J3, J4: straight line
L1, L2, Lx, Ly: length
W1: electrode width
W2: electrode width
p1, p2: pitch
θ1, θ2: angle

What is claimed is:

1. A touch panel comprising:
a transparent insulating member;
a first electrode layer that is positioned on a first surface of the transparent insulating member; and
a second electrode layer that is positioned on a second surface opposed to the first surface of the transparent insulating member,
wherein the first surface is on a contact detection side,
the first electrode layer is provided with a plurality of first strip electrodes that are disposed at intervals in a first direction and extend in a second direction perpendicular to the first direction,
the first strip electrode has a plurality of first electrode wires having a bent shape that are disposed at intervals in the first direction and extend in the second direction perpendicular to the first direction, a first pad to which the plurality of first electrode wires are electrically connected, and a plurality of first non-connecting wires that are not electrically connected to the first electrode wires,
the first electrode layer is further provided with a plurality of first dummy wires that are not electrically connected to the first electrode wires between adjacent first strip electrodes,
the second electrode layer is provided with a plurality of second strip electrodes that are disposed at intervals in the second direction and extend in the first direction,
the second strip electrode has a plurality of second electrode wires having a bent shape that are disposed at intervals in the second direction and extend in the first direction, a second pad to which the plurality of second electrode wires are electrically connected, and a plurality of second non-connecting wires that are not electrically connected to the second electrode wires,
the second electrode layer is further provided with a plurality of second dummy wires that are not electrically connected to the second electrode wires between adjacent second strip electrodes, and
in a case where an electrode width of the first strip electrode is indicated by W1 and an electrode width of the second strip electrode is indicated by W2, there is at least one combination of the first strip electrode and the second strip electrode satisfying $1.2 \leq W2/W1 \leq 2.5$ in a main sensing region not including electrodes disposed on outermost sides of the plurality of first strip electrodes and electrodes disposed on outermost sides of the plurality of second strip electrodes in a region where the first electrode layer and the second electrode layer are provided.

2. The touch panel according to claim 1,
wherein in the main sensing region, the electrode width W1 and the electrode width W2 satisfy $W1<W2$.

3. The touch panel according to claim 1,
wherein in the main sensing region, the electrode width W1 and the electrode width W2 satisfy $1.0<W2/W1 \leq 3.0$.

4. The touch panel according to claim 1,
wherein in the main sensing region, the electrode width W1 and the electrode width W2 satisfy $1.2 \leq W2/W1 \leq 2.5$.

5. The touch panel according to claim 4,
wherein the first strip electrode further has a plurality of first connecting wires electrically connecting the first electrode wires adjacent to each other, and
the second strip electrode further has a plurality of second connecting wires electrically connecting the second electrode wires adjacent to each other.

6. The touch panel according to claim 5,
wherein the first electrode wire, the first non-connecting wire, and the first connecting wire have a same line width of 5 μm or less, and
the second electrode wire, the second non-connecting wire, and the second connecting wire have a same line width of 5 μm or less.

7. The touch panel according to claim 6,
wherein in a case where a total area of the first non-connecting wires is indicated by A1, a total area of the first electrode wires and the first connecting wires is indicated by B1, and an occupation ratio of the first non-connecting wires in the first strip electrode is indicated by C1, $C1=A1/(A1+B1)$ is satisfied,
in a case where a total area of the second non-connecting wires is indicated by A2, a total area of the second electrode wires and the second connecting wires is indicated by B2, and an occupation ratio of the second non-connecting wires in the second strip electrode is indicated by C2, $C2=A2/(A2+B2)$ is satisfied, and
the occupation ratio C1 of the first non-connecting wires and the occupation ratio C2 of the second non-connecting wires satisfy $C2<C1$.

8. The touch panel according to claim 1,
wherein in the main sensing region, the electrode width W1 and the electrode width W2 satisfy $1.2 \leq W2/W1 \leq 2.0$.

9. The touch panel according to claim 1,
wherein the first electrode wire is a thin metallic wire having a line width of 10 μm or less, and the second electrode wire is a thin metallic wire having a line width of 10 μm or less.

10. The touch panel according to claim 1,
wherein the first strip electrode further has a plurality of first connecting wires electrically connecting the first electrode wires adjacent to each other, and
the second strip electrode further has a plurality of second connecting wires electrically connecting the second electrode wires adjacent to each other.

11. The touch panel according to claim 10,
wherein in a case where a total area of the first non-connecting wires is indicated by A1, a total area of the first electrode wires and the first connecting wires is indicated by B1, and an occupation ratio of the first non-connecting wires in the first strip electrode is indicated by C1, $C1=A1/(A1+B1)$ is satisfied,
in a case where a total area of the second non-connecting wires is indicated by A2, a total area of the second electrode wires and the second connecting wires is indicated by B2, and an occupation ratio of the second non-connecting wires in the second strip electrode is indicated by C2, $C2=A2/(A2+B2)$ is satisfied, and the occupation ratio C1 of the first non-connecting wires and the occupation ratio C2 of the second non-connecting wires satisfy C2<C1.

12. The touch panel according to claim 10,
wherein the first electrode wire, the first non-connecting wire, and the first connecting wire have a same line width of 5 μm or less, and
the second electrode wire, the second non-connecting wire, and the second connecting wire have a same line width of 5 μm or less.

13. The touch panel according to claim 1,
wherein in the main sensing region, the electrode width W1 and the electrode width W2 satisfy $1.5 \leq W2/W1 \leq 2.5$.

14. The touch panel according to claim 1,
wherein in a region where the first electrode layer and the second electrode layer are overlapped with each other, a mesh pattern constituted by a plurality of lattices is formed, and
the plurality of lattices have a same shape selected from the group consisting of a square, a rhombus, a regular hexagon, and an equilateral triangle.

15. A touch sensor comprising:
a transparent insulating member;
a first electrode layer that is positioned on a first surface of the transparent insulating member; and
a second electrode layer that is positioned on a second surface opposed to the first surface of the transparent insulating member,
wherein the first surface is on a contact detection side,
the first electrode layer is provided with a plurality of first strip electrodes that are disposed at intervals in a first direction and extend in a second direction perpendicular to the first direction,
the first strip electrode has a plurality of first electrode wires having a bent shape that are disposed at intervals in the first direction and extend in the second direction perpendicular to the first direction, a first pad to which the plurality of first electrode wires are electrically connected, and a plurality of first non-connecting wires that are not electrically connected to the first electrode wires,
the first electrode layer is further provided with a plurality of first dummy wires that are not electrically connected to the first electrode wires between adjacent first strip electrodes,
the second electrode layer is provided with a plurality of second strip electrodes that are disposed at intervals in the second direction and extend in the first direction,
the second strip electrode has a plurality of second electrode wires having a bent shape that are disposed at intervals in the second direction and extend in the first direction, a second pad to which the plurality of second electrode wires are electrically connected, and a plurality of second non-connecting wires that are not electrically connected to the second electrode wires,
the second electrode layer is further provided with a plurality of second dummy wires that are not electrically connected to the second electrode wires between adjacent second strip electrodes, and
in a case where an electrode width of the first strip electrode is indicated by W1 and an electrode width of the second strip electrode is indicated by W2, there is at least one combination of the first strip electrode and the second strip electrode satisfying $1.2 \leq W2/W1 \leq 2.5$ in a main sensing region not including electrodes disposed on outermost sides of the plurality of first strip electrodes and electrodes disposed on outermost sides of the plurality of second strip electrodes in a region where the first electrode layer and the second electrode layer are provided.

16. A conductive member for a touch panel comprising:
a transparent insulating member;
a first electrode layer that is positioned on a first surface of the transparent insulating member; and
a second electrode layer that is positioned on a second surface opposed to the first surface of the transparent insulating member,
wherein the first electrode layer is provided with a plurality of first strip electrodes that are disposed at intervals in a first direction and extend in a second direction perpendicular to the first direction,
the first strip electrode has a plurality of first electrode wires having a bent shape that are disposed at intervals in the first direction and extend in the second direction perpendicular to the first direction, a first pad to which the plurality of first electrode wires are electrically connected, and a plurality of first non-connecting wires that are not electrically connected to the first electrode wires,
the first electrode layer is further provided with a plurality of first dummy wires that are not electrically connected to the first electrode wires between adjacent first strip electrodes,
the second electrode layer is provided with a plurality of second strip electrodes that are disposed at intervals in the second direction and extend in the first direction,
the second strip electrode has a plurality of second electrode wires having a bent shape that are disposed at intervals in the second direction and extend in the first direction, a second pad to which the plurality of second electrode wires are electrically connected, and a plurality of second non-connecting wires that are not electrically connected to the second electrode wires,
the second electrode layer is further provided with a plurality of second dummy wires that are not electrically connected to the second electrode wires between adjacent second strip electrodes, and
in a case where an electrode width of the first strip electrode is indicated by W1 and an electrode width of the second strip electrode is indicated by W2, there is at least one combination of the first strip electrode and the second strip electrode satisfying $1.2 \leq W2/W1 \leq 2.5$ in a main sensing region not including electrodes disposed on outermost sides of the plurality of first strip electrodes and electrodes disposed on outermost sides of the plurality of second strip electrodes in a region where the first electrode layer and the second electrode layer are provided.

17. A conductive sheet for a touch panel comprising:
a transparent insulating member;
a first electrode layer that is positioned on a first surface of the transparent insulating member; and
a second electrode layer that is positioned on a second surface opposed to the first surface of the transparent insulating member,
wherein the first electrode layer is provided with a plurality of first strip electrodes that are disposed at intervals in a first direction and extend in a second direction perpendicular to the first direction,
the first strip electrode has a plurality of first electrode wires having a bent shape that are disposed at intervals in the first direction and extend in the second direction perpendicular to the first direction, a first pad to which the plurality of first electrode wires are electrically connected, and a plurality of first non-connecting wires that are not electrically connected to the first electrode wires, the first electrode layer is further provided with a plurality of first dummy wires that are not electrically connected to the first electrode wires between adjacent first strip electrodes, the second electrode layer is provided with a plurality of second strip electrodes that are disposed at intervals in the second direction and extend in the first direction, the second strip electrode has a plurality of second electrode wires having a bent shape that are disposed at intervals in the second direction and extend in the first direction, a second pad to which the plurality of second electrode wires are electrically connected, and a plurality of second non-connecting wires that are not electrically connected to the second electrode wires, the second electrode layer is further provided with a plurality of second dummy wires that are not electrically connected to the second electrode wires between adjacent second strip electrodes, and in a case where an electrode width of the first strip electrode is indicated by W1 and an electrode width of the second strip electrode is indicated by W2, there is at least one combination of the first strip electrode and the second strip electrode satisfying $1.2 \leq W2/W1 \leq 2.5$ in a main sensing region not including electrodes disposed on outermost sides of the plurality of first strip electrodes and electrodes disposed on outermost sides of the plurality of second strip electrodes in a region where the first electrode layer and the second electrode layer are provided.

* * * * *